United States Patent [19]
Blomenkamp

[11] 3,959,586
[45] May 25, 1976

[54] FREQUENCY BURST COMMUNICATION SYSTEM

[75] Inventor: Robert William Blomenkamp, Palo Alto, Calif.

[73] Assignee: Physics International Company, San Leandro, Calif.

[22] Filed: Oct. 30, 1972

[21] Appl. No.: 302,196

[52] U.S. Cl. ............................... 178/66 R; 325/39; 307/234; 328/111; 332/9 R; 332/9 T; 178/68
[51] Int. Cl.² ........................................ H04L 27/00
[58] Field of Search ............. 325/141, 142, 143, 39; 178/66 R, 67, 68; 179/15 AW, 15 AV, , 15 BA, 15 BM; 340/347 DA, 347 NT, 206; 328/111, 112; 307/263, 265, 232, 234; 332/9, 10

[56] References Cited
UNITED STATES PATENTS

| 3,048,784 | 8/1962 | Scherer | 178/68 |
|---|---|---|---|
| 3,065,362 | 11/1962 | Benson | 307/265 |
| 3,231,877 | 1/1966 | Marlot | 340/206 |
| 3,281,806 | 10/1966 | Lawrance et al. | 325/142 |
| 3,281,828 | 10/1966 | Kaneko | 340/347 R |
| 3,337,691 | 8/1967 | Litchman | 325/141 X |
| 3,340,476 | 9/1967 | Thomas et al. | 328/14 X |
| 3,404,231 | 10/1968 | Aaron et al. | 325/141 X |
| 3,406,255 | 10/1968 | Lender | 178/67 |
| 3,471,646 | 10/1969 | Magnuski et al. | 178/66 R X |
| 3,500,387 | 3/1970 | Craven et al. | 340/347 R |
| 3,522,539 | 8/1970 | Levine et al. | 378/66 R X |
| 3,524,023 | 8/1970 | Whang | 178/67 X |
| 3,602,735 | 8/1971 | Lodi | 307/263 |
| 3,609,728 | 9/1971 | Quinn et al. | 340/206 |
| 3,667,046 | 5/1972 | Schoolcraft | 325/142 X |
| 3,715,510 | 2/1973 | Birnbaum et al. | 179/15 A X |
| 3,725,578 | 4/1973 | Brown et al. | 178/7.5 D X |
| 3,899,637 | 8/1975 | Willard et al. | 178/66 R X |

*Primary Examiner*—Robert L. Griffin
*Assistant Examiner*—Aristotelis M. Psitos
*Attorney, Agent, or Firm*—Robert R. Tipton

[57] ABSTRACT

A digital or analog signal containing information is discriminated into identifiable bit bundles of information which are modulated into pulses of an oscillating current whose pulse length corresponds to a particular bundle of information which is of shorter duration than the unmodulated bundle of information and which is multiplexed by time zones.

20 Claims, 29 Drawing Figures

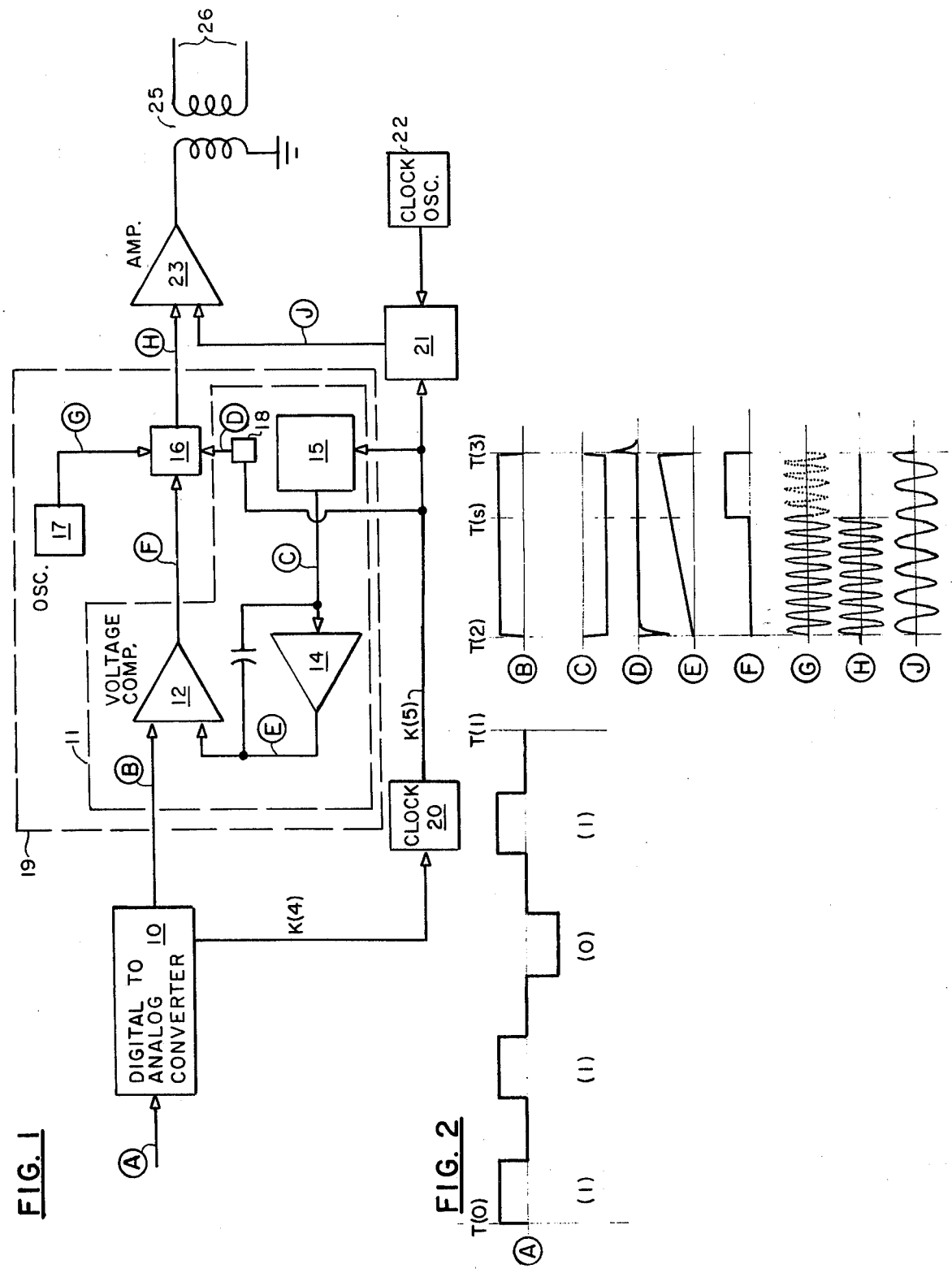

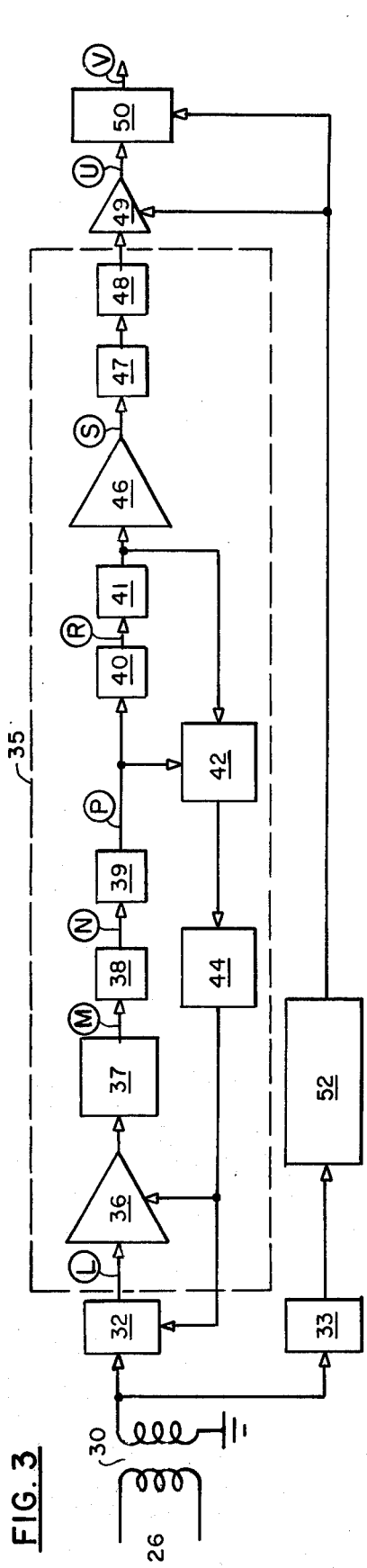
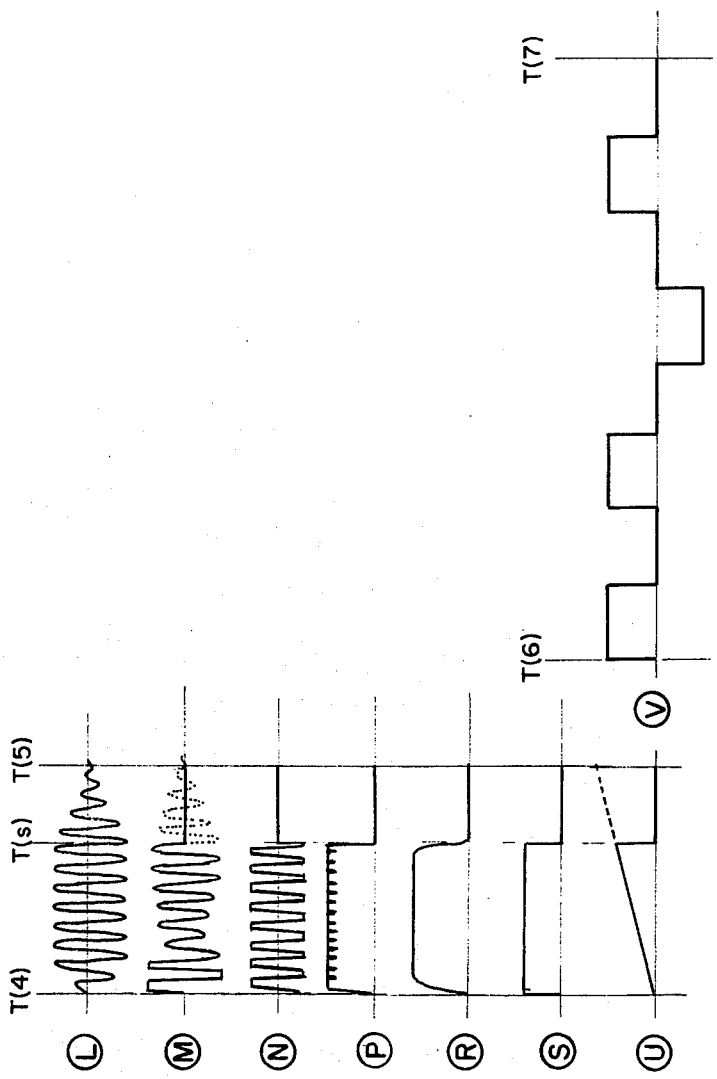
FIG. 3
FIG. 4

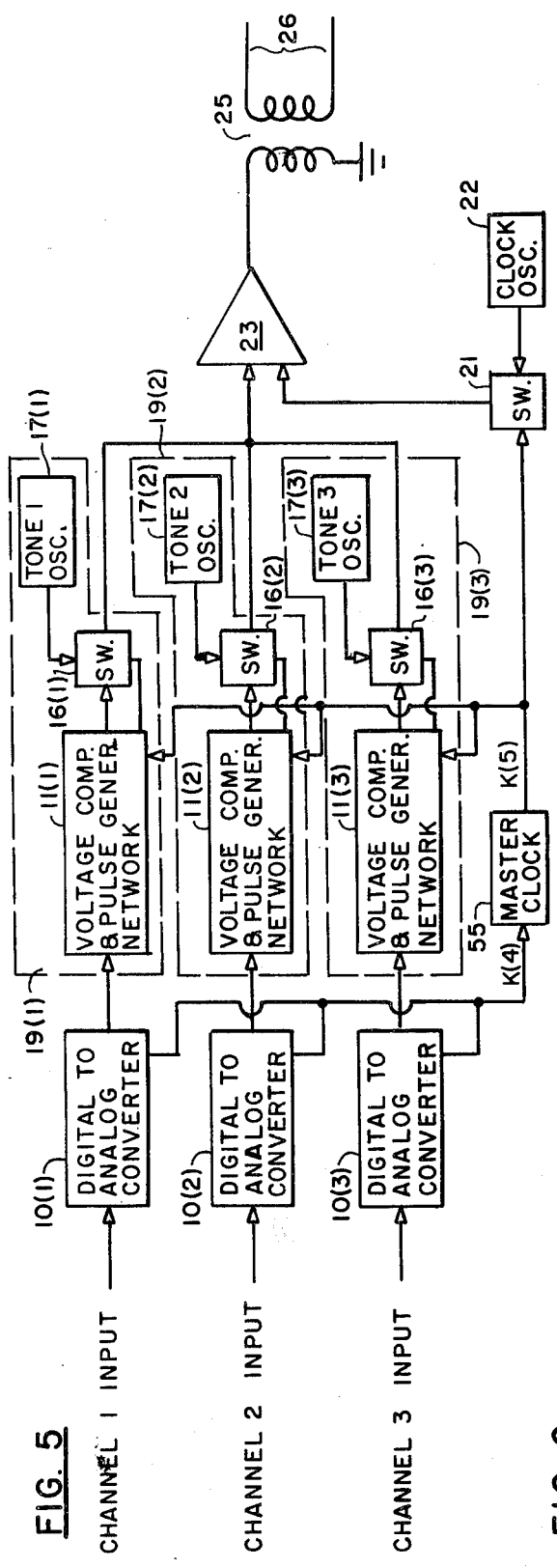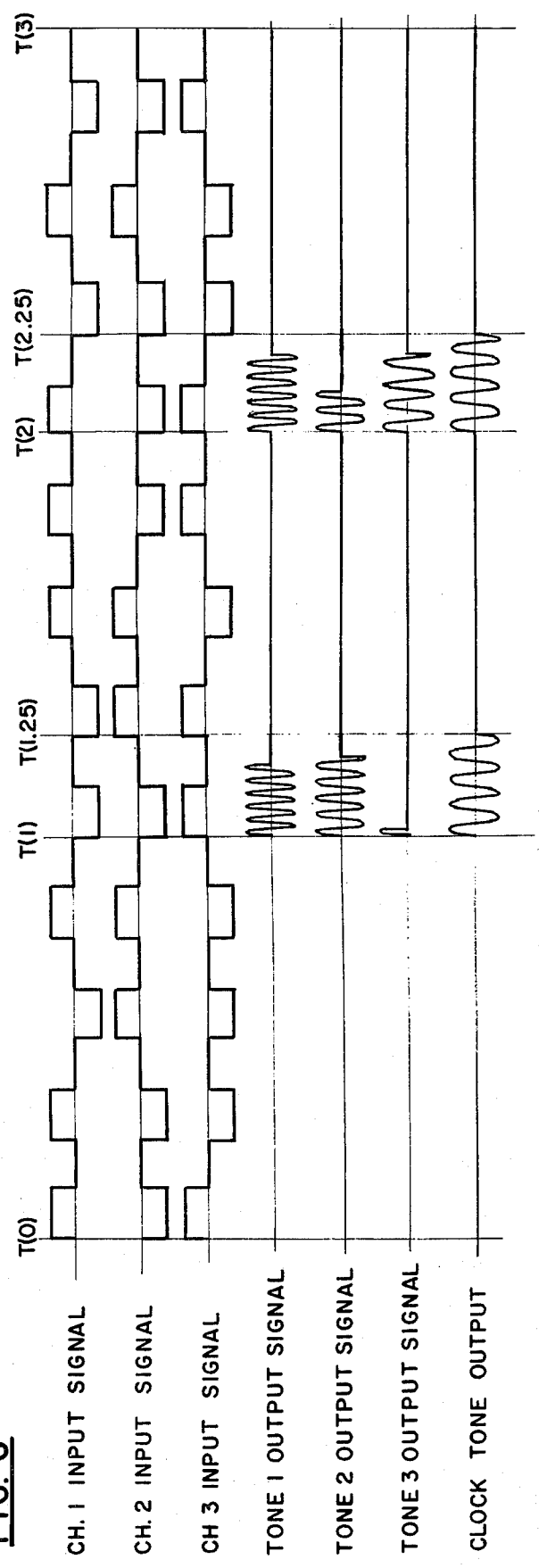
FIG. 5
FIG. 6

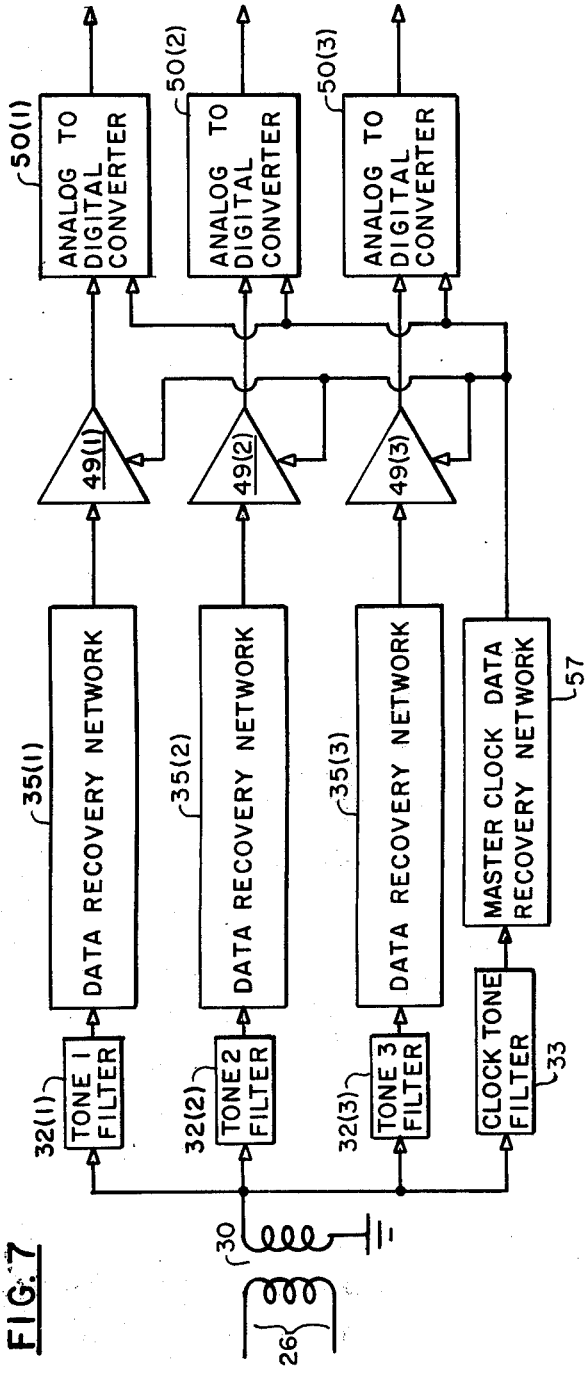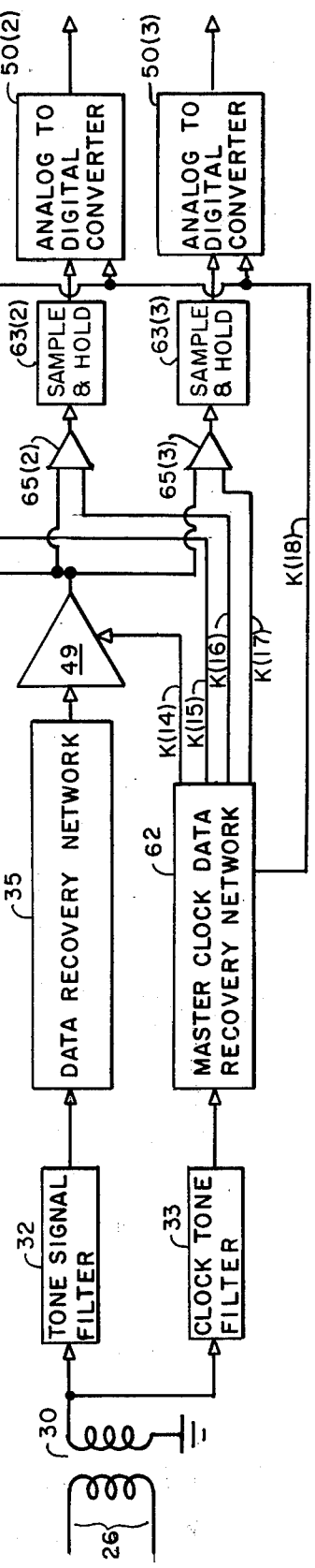
FIG. 7
FIG. 10

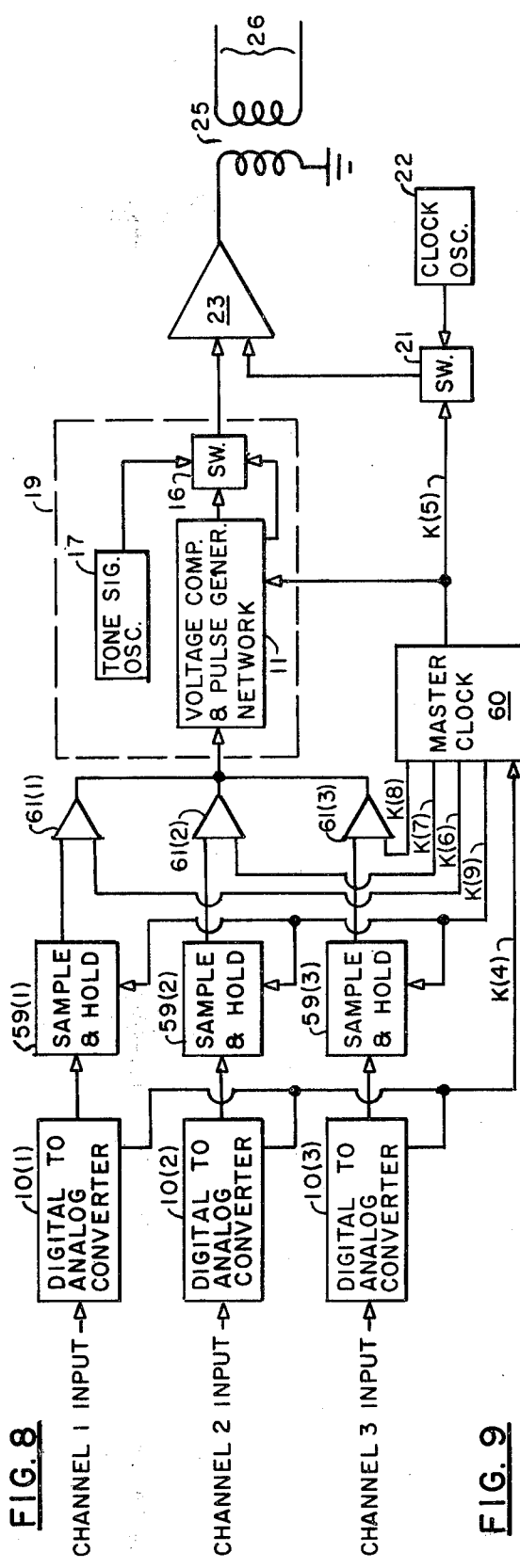

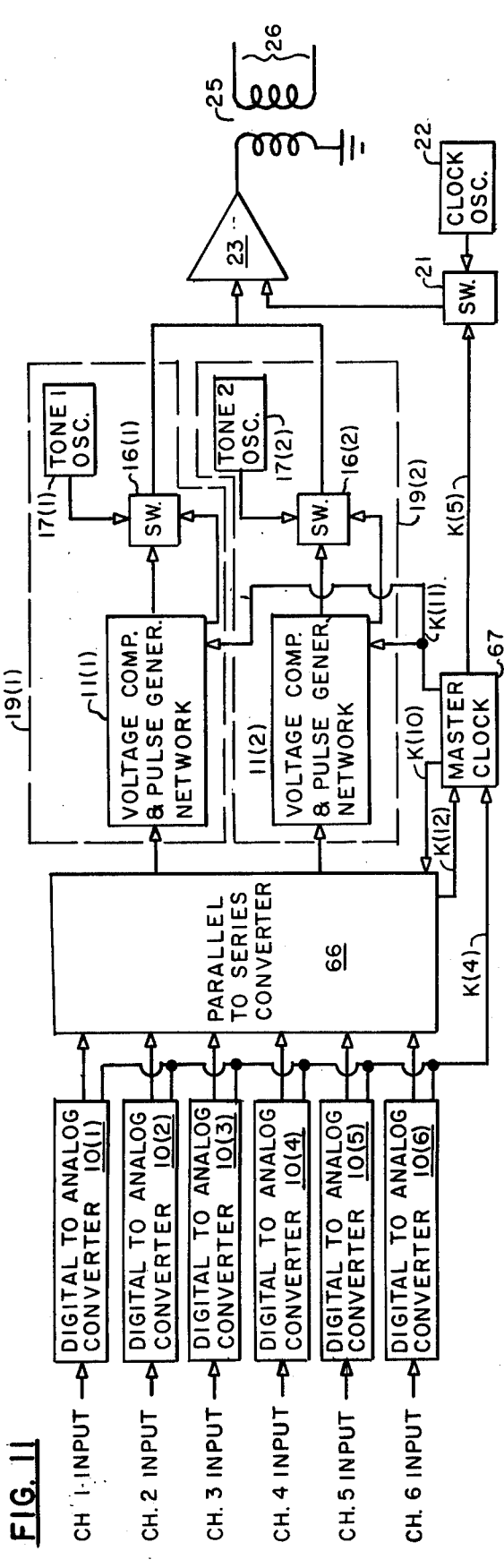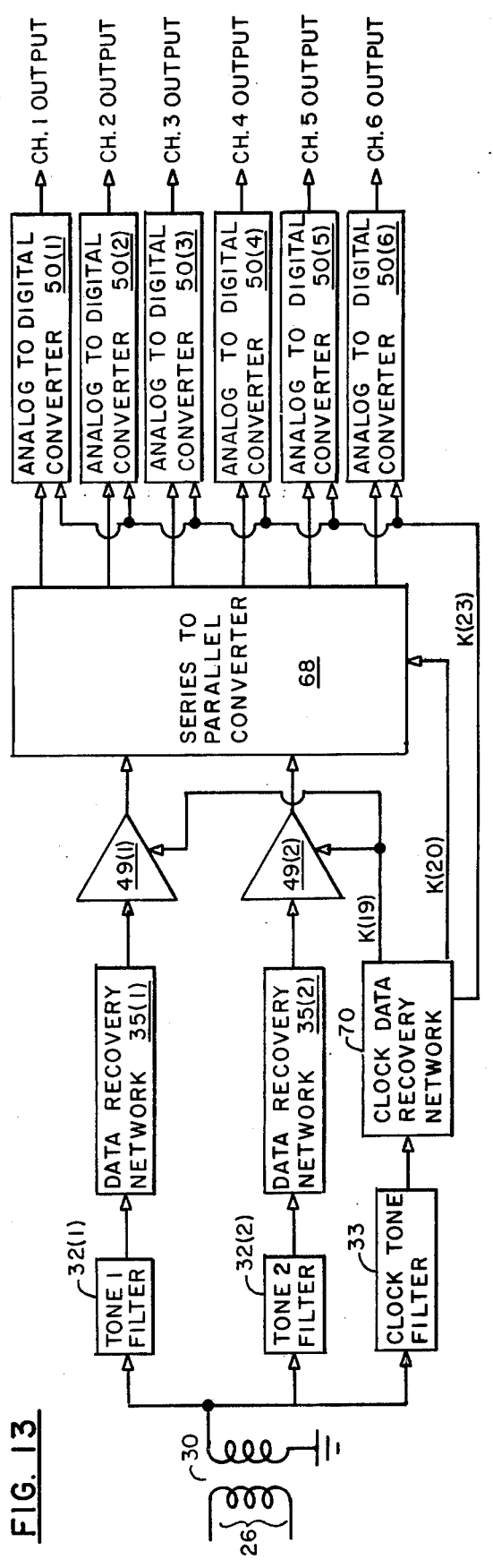
FIG. 11
FIG. 13

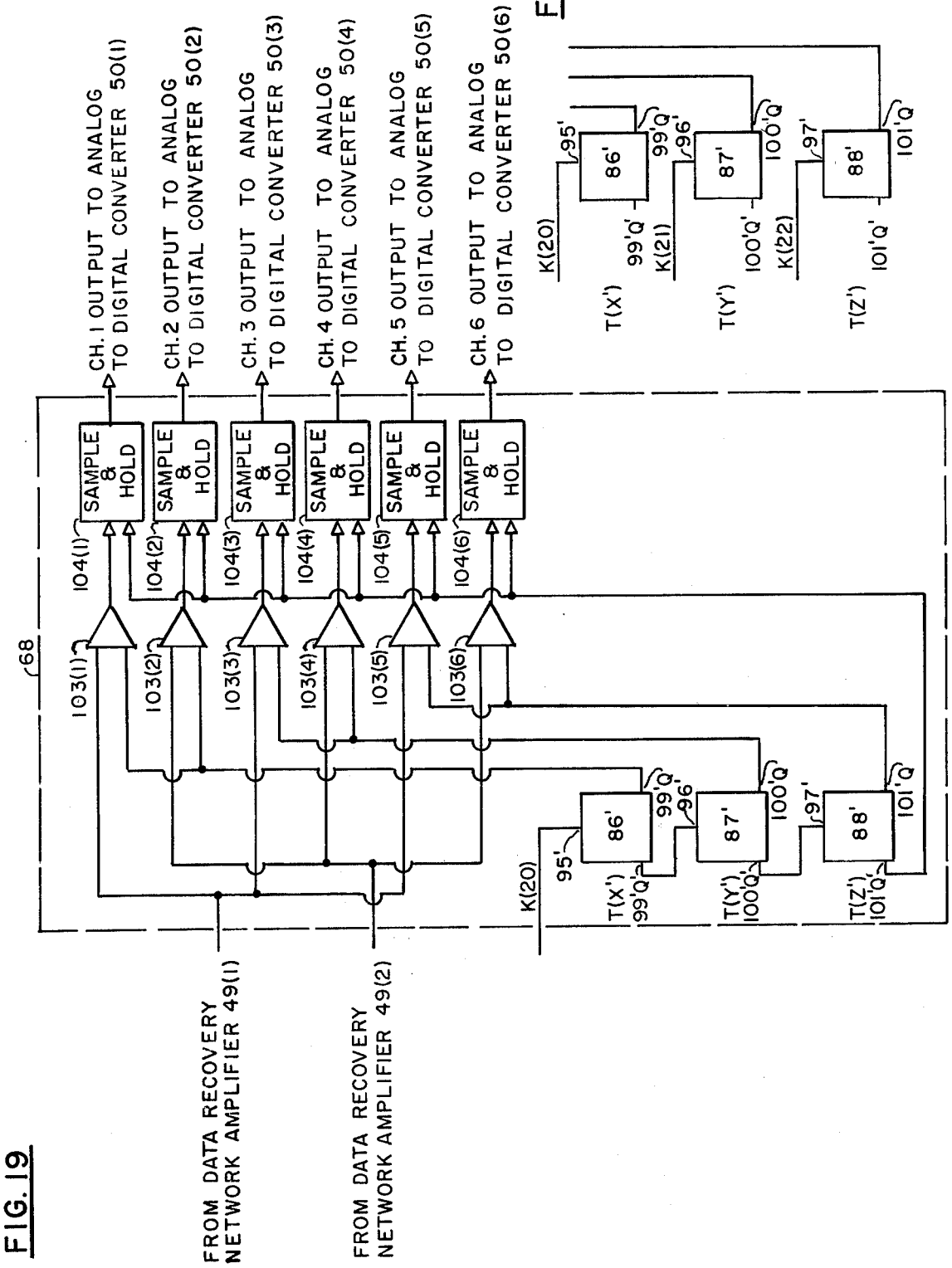

3,959,586

FREQUENCY BURST COMMUNICATION SYSTEM

BACKGROUND OF THE INVENTION

This invention relates to communication systems and in particular to systems for modulating and demodulating a communication signal.

The well known methods of modulating a signal of the prior art includes amplitude modulation, frequency modulation, pulse position modulation, pulse width modulation and pulse code modulation.

Amplitude modulation takes a low frequency incoming signal and applies it to a high frequency carrier to vary the amplitude of the carrier in accordance with the amplitude of the incoming signal.

Frequency modulation takes a low frequency incoming signal and converts its variations in amplitude into variations in frequency of a high frequency carrier above and below a given frequency.

Pulse position modulation takes a low frequency incoming signal which is converted into a pulse whose position in a fixed time period corresponds to an instantaneous amplitude of the signal.

Pulse width modulation takes a low frequency incoming signal which is converted into a pulse whose length corresponds to the instantaneous amplitude of the incoming signal.

Pulse code modulation takes a low frequency incoming signal and converts it into a group of pulses defining a binary code corresponding to the instantaneous amplitude of the incoming signal.

Each of the prior art modulation methods can be multiplexed for transmission over a common pair of conductors, however, the amount of information that can be transmitted for a unit period of time is limited either by the frequency of the modulated carrier or the pulse period.

In all of the prior art methods of modulation, the time period of the incoming signal is the same time period for the modulated signal, that is, a given amount of information per unit of time in the modulated signal is the same as for the amount of information in the incoming unmodulated signal.

SUMMARY OF THE INVENTION

The modulation system of the present invention, rather than modulating each element of the incoming information carrying signal, modulates the information contained in the incoming signal by detecting, discriminating, identifying and grouping bits or units of information into bundles of information which are converted into pulses of an oscillating wave whose duration corresponds to the particular bundle of information. The maximum pulse length is arranged to be less than the time period for transmitting the bundle of information without modulation. Because the modulated pulse duration is less than the time period of the unmodulated signal, concurrent incoming signals can be multiplexed in a variety of ways.

It is, therefore, an object of the present invention to provide a modulation system for an information carrying signal that does not need a carrier.

It is another object of the present invention to provide a modulation system for an information carrying signal in which the modulated signal is of a shorter time duration than the information carrying input signal.

It is a further object of the present invention to provide a modulation system for an information carrying signal in which the information is modulated.

It is still another object of the present invention to provide a modulation system in which the modulated signal can be multiplexed with other similarly modulated signals to achieve greater information density in a communication line.

It is still a further object of the present invention to provide a modulation system for modulating and demodulating digital signals.

It is another object of the present invention to provide a modulation system for an information carrying signal which compresses information from an incoming signal into a shorter time period.

These and other objects of the present invention will be manifest upon careful study of the following detailed description when taken together with the drawings.

BRIEF DESCRIPTION OF THE DRAWINGS

FIG. 1 is a schematic block diagram of a single modulation circuit of the present invention.

FIG. 2 is a series of graphs of wave shapes showing voltages at various parts of FIG. 1 as a function of time.

FIG. 3 is a schematic block diagram of a single demodulation circuit of the present invention.

FIG. 4 is a series of graphs of wave shapes showing voltages at various parts of FIG. 3 as a function of time.

FIG. 5 is a schematic block diagram of a three channel input frequency multiplexed system using the modulators described in FIG. 1.

FIG. 6 is a series of graphs of wave shapes of the input and modulated signals of FIG. 5.

FIG. 7 is a schematic block diagram of the three channel frequency multiplexed system using the demodulators described in FIG. 3.

FIG. 8 is a schematic block diagram of a three channel time zone multiplexed system using the modulator described in FIG. 1.

FIG. 9 is a series of graphs of wave shapes of the input and modulated signals of the circuit of FIG. 8.

FIG. 10 is a schematic block diagram of the three channel time zone multiplexed system using the demodulators described in FIG. 3.

FIG. 11 is a schematic block diagram of a six channel combined frequency and time zone multiplexed system using the modulators described in FIG. 1.

FIG. 13 is a schematic block diagram of the six channel combined frequency and time zone modulation system using the demodulators described in FIG. 3.

FIG. 19 is a schematic block diagram of the series to parallel converter of FIG. 13.

FIG. 19A is a second connection configuration of the gating circuits of FIG. 19.

DESCRIPTION OF THE PREFERRED EMBODIMENT

Figure 12:
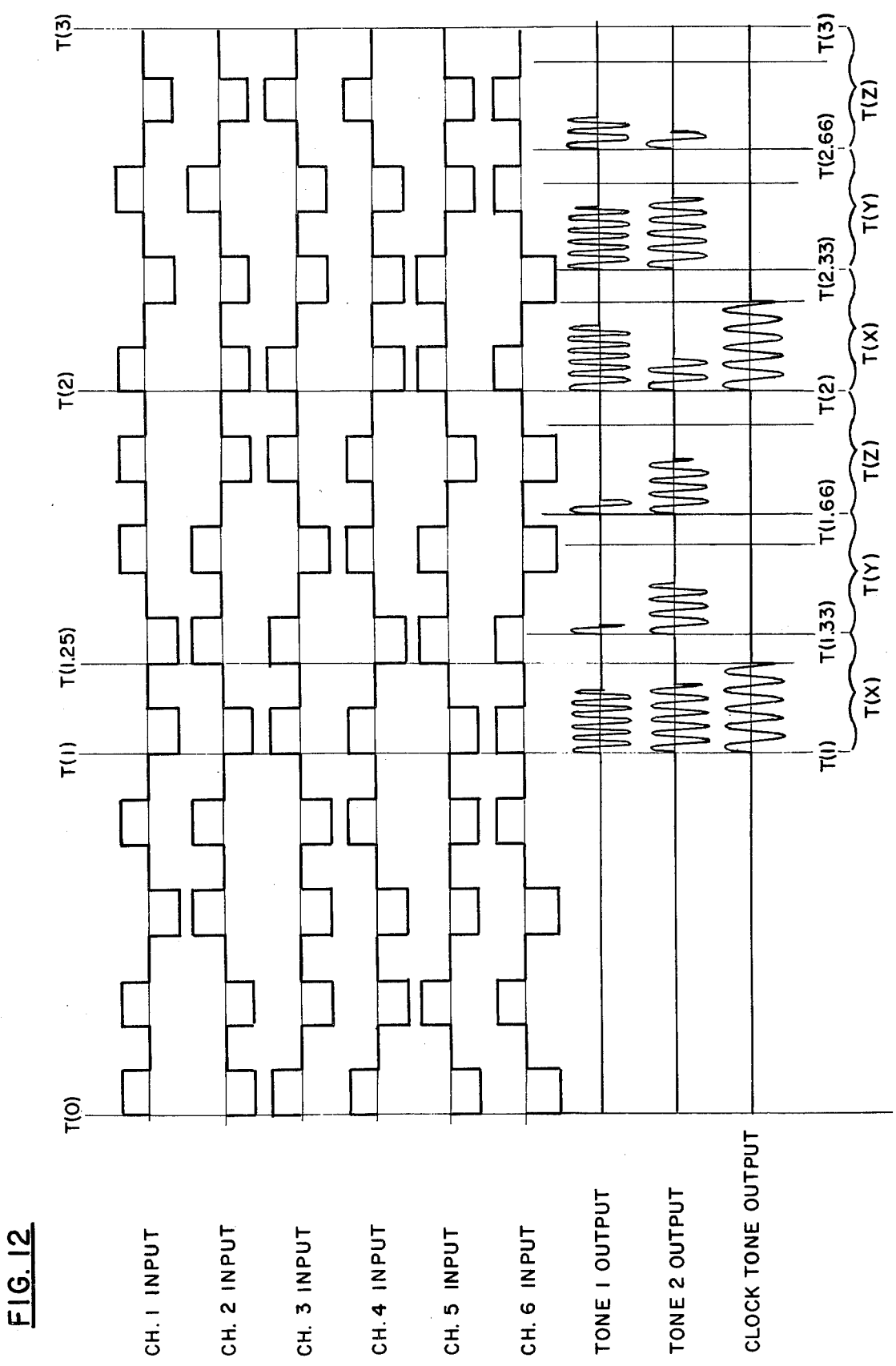
FIG. 12 is a series of graphs of wave shapes of the input signals and modulated and multiplexed signals of the circuit of FIG. 11.

The apparatus and system of the present invention for modulating an information carrying signal is shown in its basic block diagram form in FIG. 1 with the wave shapes of the unmodulated and modulated signal shown in FIG. 2 for various points in the circuit of FIG. 1. For the purposes herein, the present invention will be referred to as a Frequency Burst Communication System.

The apparatus for demodulating the signal that was modulated by the circuit of FIG. 1 is shown in FIG. 3 with the wave shape of the modulated and demodulated signal shown in FIG. 4 for various parts of the circuit of FIG. 2.

As used in the following description, the term "pulse of an oscillating wave" is defined as an oscillating current or voltage having a constant frequency and a constant maximum amplitude with the beginning of oscillation occuring at zero or a reference voltage and the end of oscillation occuring at zero or the same reference voltage. In other words, an oscillating wave pulse. This definition could also apply to sound waves. The envelope of the "pulse of an oscillating wave" used in the present invention will generally comply with the usual definition of "pulse", namely, "a waveform whose duration is short compared to the time scale of interest, and whose initial and final values are the same". However, the "oscillating wave pulse" as defined herein must be distinguished from a D.C. pulse in which a constant voltage or current is created between the beginning and end of the pulse rather than an alternating current or voltage. The oscillating wave pulse, as shown in FIG. 2, curves G and H, is, in the embodiment shown, an oscillating sinusoidal wave pulse.

In the embodiment disclosed herein, a digital signal is used as the incoming signal. This digital signal can be either representative of alphabetic characters or it can be representative of the conversion of an audio signal which has been converted to a digital signal or an amplitude or frequency modulated signal which has been converted to a digital signal.

MODULATION

The basic apparatus for modulation of an input information carrying signal is shown in FIG. 1. in which the digital input signal is first applied to the input side of digital to analog converter 10.

For the purpose of this example, and as will be used throughout this description, the digital signal which is converted comprises a four bit bundle or unit of information occuring in a time period from T(0) to T(1) as illustrated by curve A of FIG. 2. This time period will be referred to, variously, as the signal time period, bit bundle period or information bundle period.

Defining each positive pulse as a 1 bit and a negative pulse as a 0 bit, the bit bundle illustrated by curve A would be indicated as 1101. Thus for a four bit combination, 16 different combinations of bundles of information can be discriminated.

Digital to analog converter 10, using circuitry which will be described below, converts the bundle of information of four bits of information into a voltage of a particular value corresponding to the particular combination of bits in the bundle. For the present example, since there are 16 possible combinations, digital to analog converter 10 will convert the particular combination shown into a pulse having a voltage of V(1101) which is one of the 16 voltage increments as illustrated by curve B of FIG. 2 taken at point B in FIG. 1.

Basically, the frequency burst communication system of the present invention comprises a digital to analog converter 10 whose output side is connected to the input side of modulation network 19, defined by the circuits contained within the dashed lines, whose output is connected to the input side of amplifier 23. The output side of amplifier 23 is connected to isolation transformer 25 which is coupled to a transmission medium such as telephone line 26.

Included in modulation network 19, is voltage comparator and pulse generator network 11, defined by the circuits contained within the second set of dashed lines performs the operations forming the heart of the modulation process.

Voltage comparator and pulse generator network 11 comprises voltage comparator circuit 12, having one input connected to digital to analog converter 10 and having the other input connected to the output side of integrator circuit 14 whereby the output of digital to analog converter 10 and integrator 14 can be compared.

The input side of integrator circuit 14 is connected to one output of pulse generator 15.

The two outputs from network 11, namely, the output from voltage comparator circuit 12 and differentiating circuit 18 are connected to the control side of signal switch 16.

The output from voltage comparator circuit 12 is connected to the off control of switch 16 while the output of differentiating circuit 18 is connected to the on side of switch 16.

The input line side of switch 16 is connected to the output side of signal oscillator 17, while the load, i.e., output side of switch 16, which is also the output side of modulation network 19, is connected to one input of amplifier 23.

To act as the master control or timing device for the various elements of the circuit of FIG. 1, a master clock 20 is provided whose output timing signal pulse is connected to digital to analog converter 10 and also to signal pulse generator 15 and clock pulse generator switch 21.

Clock oscillator 22, whose signal tone is illustrated by curve J and whose frequency is different from that of signal oscillator 17, is connected to the line, i.e., one input side of clock signal switch 21. The load side, i.e., output side of switch 21 is connected to the other input side of amplifier 23.

At time T(2), after receipt of the fourth pulse in the four pulse series, as described hereinbefore, several events occur simultaneously:

a. A pulse from digital to analog converter 10 is transmitted to clock 20 over line K(4) to indicate the end of a four-bit bundle of digital information.

b. A pulse from clock 20 initiates the serial transmission of an analog voltage from analog to digital converter 10 to voltage comparator circuit 11.

c. The pulse from clock 20 also initiates a pulse from pulse generator 15 and a pulse from differentiating circuit 18 to turn oscillator 17 on from switch 16.

d. The pulse from pulse generator 15 is integrated by integrator circuit 14 to create a ramp voltage which is applied to one input side of voltage comparator 12.

e. The pulse from clock 20 causes clock pulse generator switch 21 to apply the clock tone (timing signal) from clock oscillator 22 to one input side of amplifier 23 which results in a pulsed tone beginning at time T(2) and ending at time T(3).

Thus, to one side of voltage comparator circuit 11 is applied the analog voltage corresponding to the input digital signal 1101.

To the other side of voltage comparator circuit 11 is concurrently applied a ramp voltage as shown in curve E which is generated by integrator circuit 12 based on the square wave pulse of curve C generated by pulse generator circuit 14.

The ramp voltage of curve E begins at zero voltage and rises to a voltage which is equal to or slightly greater than the maximum voltage generated by digital to analog converter 10. The time period of the ramp voltage of curve E is from T(2) to T(3) which can be established for any particular time duration but, for the advantages that will be described below, the time period is established to be of a shorter duration than the time period T(0) to T(1) and which begins a short time after receipt of the last bit in the bit bundle series.

As the ramp voltage of curve E rises, at some time, T(s), it will become equal to voltage V(1101), at which time voltage comparator circuit 11 will conduct and cause a pulse, of the shape shown in curve F, to be applied to one side of switch 16, turning switch 16 off.

Switch 16 was previously turned on by a pulse of the shape as shown in curve D, applied at time T(2).

Oscillator 17 is connected to switch 16 and would normally apply a continuous alternating current of a particular frequency of the shape shown in curve G. The operation of switch 16 is such that, instead of disconnecting oscillator 17 from amplifier 23, switch 16 turns oscillator 17 off during the period indicated by the dotted portion of curve G of FIG. 2.

Thus the pulse at time T(2), curve D of FIG. 2, turns switch 16 on permitting the oscillator 17 signal tone to be connected to amplifier 23 through switch 16, while the pulse at time T(s), curve F of FIG. 2, turns switch 16 off at time T(s), resulting in an output signal pulse of an oscillating wave at the load side of switch 16 (the input side of amplifier 23) of a particular length as illustrated in curve H of FIG. 2.

The pulse length T(2)–T(s) thus corresponds to a particular voltage V(1101) which corresponds to the bundle of bit information 1101 of the input signal.

Therefore, to provide for sixteen bundles of information, time period T(2)–T(3) is divided into 16 time periods or lengths each beginning at time T(2).

In order to create the time window T(2)–T(3), a master clock 20 is used in conjunction with pulse generator circuit 15. The time window determines the length of the tone pulse of curve J. The input to clock 20 is connected to digital to analog converter 10 by line K(4) with its output side connected to signal pulse generator 15 and the control side of clock pulse generator switch 21 by line K(5).

Clock oscillator 22, as previously described, generating a tone frequency (curve J) different from that of signal oscillator 17, is connected to the line, i.e. one input side of switch 21 while the load, i.e., output side of switch 21 is connected to the other input side of amplifier 23.

Also connected to the input side of amplifier 23, as previously described, is the output of signal switch 16 so that the signal of curve H and timing pulse of curve J are amplified and transmitted to circuit or telephone line 26 through isolation transformer 25.

DEMODULATION

With particular reference to FIG. 3, the demodulation apparatus of the present invention comprises an input signal isolation transformer 30 whose input side is connected to circuit or telephone line 26 and whose output side is connected to the input side of signal filter 32 and clock filter 33.

The output side of signal filter 32 is connected to the input side of data recovery network 35 which comprises, basically, signal amplifier 36 whose output side is connected to the input side of signal compensator 37.

Serially connected to the output side of signal compensator 37 are sine wave clipper 38, rectifier 39, first smoothing filter 40, and second smoothing filter 41.

A pulse end detector 42 is connected across filters 40 and 41 with its output side connected to the input side of ring-down eliminator 44, whose output side is connected to amplifier 36 and filter 32 in order to control amplification of the ring-down signal.

Data recovery network 35 further comprises a voltage comparator 46 whose input side is connected to the output side of second smoothing filter 41 and whose output side is connected serially to voltage matching circuit 47 and impedance matching circuit 48, whose output side constitutes the output side of data recovery network 35.

The output side of data recovery network 35 is then connected to the input side of integrator 49 whose output side is connected to the input side of analog to digital converter 50.

To control the flow of information through the demodulation circuit of FIG. 3, the output of clock filter 33 is connected to the input side of clock data recovery network 52 whose output side is connected to integrator 49 and analog to digital converter 50.

DEMODULATOR OPERATION

Although the initial pulse of an oscillating wave is evenly amplitude modulated over the entire pulse length when transmitted, as can be seen in curve H of FIG. 2, after suffering through the various impedances, capacitances, inductances and resistances of the transmission media such as telephone line 26, it is received at isolation transformer 30 and through input signal filter 32 (FIG. 3) in the distorted form illustrated in curve L of FIG. 4.

The front portion of the signal pulse at time T(4) no longer has the rise time equal to the frequency of the tone signal but rather has a rise time which is slower, thus distorting the leading edge of the pulse. The trailing edge portion of the pulse at time T(s) no longer has the sharp fall time as when originally produced but is followed by a ring-down or damping signal which may extend beyond the modulation or maximum pulse period at time T(5).

To correct these distortions and defects of the incoming signal, various circuits have been developed which operate on the signal to convert it to a usable form.

After passing through filter 32 the input signal is then amplified by amplifier 36 whose output signal is transmitted to signal compensator 37 where the front or leading portion of the input signal pulse is amplified and clipped to produce a signal pulse as illustrated in curve M. The dotted portion of curve M represents that portion of the wave form eliminated by ring-down circuit 44 as described below.

This output signal from signal compensator 37 is passed to sine wave clipper 38 where the top portion of the waves are clipped as shown in curve N.

The signal is then rectified by rectifier 39 to produce a rectified signal as illustrated in curve P.

The rectified signal is then filtered by first smoothing filter 40 and then by second smoothing filter 41 to produce an almost square wave pulse as illustrated in curve R. It will be noted that the leading and trailing portions of the pulse still have a slope.

This output pulse from filter 41 then passes through voltage comparator 46 which compares this pulse with a voltage approximately one-tenth the amplitude of the pulse so that voltage comparator 46, in effect, lowers the turn-on-turn-off threshold so that the first 10 percent of the rising leading edge and the last 10 percent of the trailing edge of the pulse is detected, the curve of which is illustrated in curve R. Thus the output pulse from voltage comparator 46, as shown in curve S, establishes the pulse length of the information carrying pulse corresponding to the pulse length of the originally produced pulse corresponding to the input bit bundle 1101.

This output pulse signal is then clipped by voltage matching circuit 47 to a voltage level than can be handled by later circuitry and then passes through impedance matching circuit 48 to the output side of data recovery network 35 and on to integrator 49.

With respect to the problem of ring-down, as can be seen from curve L, ring-down begins to occur at time T(s). Following known physical laws with respect to damping of oscillating waves, the envelope of the ring-down signal follows a logarithmic curve.

End detector circuit 42 is arranged to measure the slope of the trailing edge of the envelope of the input signal, the now rectified signal of curve R, so that, when the amplitude of the next wave is about 68% less than the previous wave, a signal is sent to ring-down eliminator circuit 44 which then cuts off amplification of the ring-down signal which is shown as a dotted damped oscillating wave in curve M.

It has been found, that although a one cycle period is theoretically necessary to detect a drop of 63%, slope measurement and cut-off of the trailing edge of the signal pulse has been achieved with a discrimination of only one-quarter of a cycle.

It should also be noted that as the frequency of the pulse tone increases, the one-quarter wave length discimination ability remains constant so that at higher frequencies, a greater number of bundles of information can be distinguished for a given clock pulse period. In other words, the information carrying capacity for a given clock period increases with increase in pulse tone frequency.

Integrator circuit 49 could more aptly be called "pulse length detector" circuit 49 since it converts the pulse received from data recovery network 35 into an analog voltage corresponding to one of the 16 voltage values established for bit bundle 1101.

The output from integrator circuit or pulse length detector 49 is applied to the input side of analog to digital converter 50 where the pulse signal is converted into a serially transmitted bundle of bits 1101 beginning at time T(6) and ending at time T(7).

Integrating circuit 49 can be replaced by any device which measures pulse length by various techniques common in the art such as gating an oscillator of a known high frequency and measuring the number of cycles for the period of the pulse.

In order to provide the window through which the demodulated signal passes after it reaches integrator circuit 49, clock recovery network 52 converts the timing tone pulse into a signal that actuates integrator circuit 49 to begin measuring pulse length and time the analog to digital converter operation to provide a digital output at time T(6), a short time after the end of the clock period at time T(5).

Thus, in summary, the input digital signal defined by the bundle of information or bits 1101 serially received from the time period T(0) to T(1), is converted to a voltage V(1101) corresponding to bundle 1101.

Voltage 1101 is converted to a pulse of an oscillating wave of a particular frequency or tone having a pulse length to pulse period rato of (T(s)–T(2))/(T(-3)–T(2)), which can be transmitted over a transmitting media such as telephone line or by electromagnetic radiation.

The received pulse, distorted by the transmitting media, is then converted to a square wave pulse having a pulse length to pulse period ratio of (T(s)–T(2))/(T(-3)–T(2)), which is detected and converted back to an analog voltage V(1101) which, in turn, is converted back to a bundle of information 1101 which is operably identical to the input information signal.

The time period T(3)–T(2) is made less than the time period of the original bit bundle T(1)–T(0).

Thus the input signal can be compressed in time with the following results with respect to multiplexing.

MULTIPLEXING

Because the frequency burst modulation system of the present invention compresses the modulated information carrying signal into a shorter time period than the original unmodulated signal and since a multiplicity of pulse tone frequencies can be used, there are thus two degrees of freedom for multiplexing simultaneous input signals; one, by time zone multiplexing, and two, by tone or frequency multiplexing, both of which methods can be combined in various ways.

Tone or Frequency Multiplexing:

This type of multiplexing is fairly well known in the art and is one in which each concurrent signal is modulated to become a signal having a different frequency which is superimposed on one circuit or telephone line for transmission. Filters are used to separate the different tones at the receiving end of the line for demodulation.

In this respect, FIGS. 5, 6, and 7 illustrate such a system for the present invention.

For the purpose of this example, three concurrent digital signals are used which are carried on channels 1, 2, and 3.

FIG. 5 is a schematic block diagram of the tone multiplexed system.

FIG. 6 is a diagram of the wave shapes of the input signal and the modulated signal wave corresponding to the input signal as a function of time and voltage.

FIG. 7 is a simplified block diagram of the tone multiplexed demodulation system.

In FIG. 5, since it uses similar circuitry as that of FIG. 1, but for different channels, the same reference numerals will be used but with a suffix numeral in parentheses indicating its corresponding channel.

For example, in FIG. 1, the digital to analog converter is identified by reference numeral 10. In FIG. 5, the digital to analog converter for channels 1 through 3 are identified as digital to analog converters 10(1), 10(2), and 10(3), respectively.

The same applies to voltage comparator and pulse generation networks 11(1), 11(2), and 11(3), respectively, of FIG. 5.

With particular reference to FIG. 5, the three channel tone multiplexed circuit of the present invention comprises digital to analog converters 10(1), 10(2), and 10(3) serially connected, respectively, first to voltage comparator and pulse generating network 11(1), 11(2), and 11(3), respectively, next, to switch 16(1), 16(2), and 16(3), respectively, whose load sides are connected to amplifier 23 whose output, in turn, is connected to isolation transformer 25 feeding transmitting media or telephone line 26.

The line side of switches 16(1), 16(2), and 16(3) are connected, respectively, to the output of tone 1 oscillator 17(1), tone 2 oscillator 17(2), and tone 3 oscillator 17(3), each of which generates a different frequency tone.

A tone multiplexing master clock 55 is connected to digital to analog converters 10(1), 10(2), and 10(3) by line K(4), as well as voltage comparator and pulse generator networks 11(1), 11(2), and 11(3) by line K(5).

Master clock 55 is also connected to the control side of switch 21 with the line side of switch 21 connected to the output side of clock oscillator 22 whose frequency is different from that of tone 1 oscillator 17(1), tone 2 oscillator 17(2), and tone 3 oscillator 17(3).

The load side of switch 21 is, similar to FIG. 1, connected to the input side of amplifier 23.

With particular reference to FIG. 6, there is shown the three digital signals which are applied concurrently to the input sides of digital to analog converters 10(1), 10(2), and 10(3).

Using the same criteria as described for FIGS. 1 and 2, a four bit sequence of pulses are taken as the bundle of digital information being modulated.

In FIG. 6, three such bundles are shown, one for the time period T(0) to T(1), the next for the time period T(1) to T(2), and the third for the time period T(2) to T(3).

Therefore, taking a positive pulse as a 1 and a negative pulse as a 0, Table 1 is a tabulation of the input signals.

TABLE 1

| Channel | Signal Time Period | Input Information Bundle |
|---|---|---|
| 1 | T(0)–T(1) | 1101 |
| 1 | T(1)–T(2) | 0011 |
| 1 | T(2)–T(3) | 1010 |
| 2 | T(0)–T(1) | 0011 |
| 2 | T(1)–T(2) | 0110 |
| 2 | T(2)–T(3) | 0010 |
| 3 | T(0)–T(1) | 1000 |
| 3 | T(1)–T(2) | 1101 |
| 3 | T(2)–T(3) | 1001 |

With respect to channel 1, the digital signal for the time period T(0)–T(1), upon entering digital to analog converter 10(1) is converted to an analog voltage V(1101) which is modulated into a pulse of a particular duration by voltage comparator and pulse generator network 11(1) utilizing tone 1 oscillator 17(1) and switch 16(1), as previously described for FIG. 1.

The maximum pulse period is controlled by master clock 55, and, for the example of FIGS. 5, 6, and 7, the pulse period is established to be one-quarter of the time period for the four bit bundle of digital information.

The clock tone pulse length shown in FIG. 6 extends from time T(1) to T(1.25) and from T(2) to T(2.25), etc.

Although, in FIG. 1, the tone pulse begins at time T(2), a short time after the end of the four bit sequence, in practice, this time is very short so that for FIG. 6, the conversion time of the bit bundle takes place almost immediately after detection of the fourth bit with the modulation pulse beginning at time T(2), that is, the beginning of the next bit bundle period.

Thus, in FIG. 6, the pulse length for tone 1 in the time period T(1)–T(1.25) corresponds to and represents the bit bundle of channel 1 for the time period T(0) to T(1).

Likewise, the pulse length for tone 1 in the time period T(2)–T(2.25) corresponds to and represents the bit bundle of channel 1 for the time period T(1) to T(2).

In a similar manner, the pulse length for tones 2 and 3 correspond to the bit bundles for channels 2 and 3 in the respective time periods.

It will be noted in FIG. 6 that the bit bundle for channel 1, time period T(0)–T(1) is identical to the bit bundle for channel 3, time period T(1)–T(2). The pulse length for tone 1 in time period T(1)–T(1.25) is, therefore, equal to the pulse length for tone 3 in the time period T(2)–T(2.25).

In tabular form, the tone multiplexed signal would be as shown in Table 2.

TABLE 2

| Channel | Time Period | Tone Signal |
|---|---|---|
| 1 | T(0)–T(1) | 1 |
| 1 | T(1)–T(2) | 1 |
| 1 | T(2)–T(3) | 1 |
| 2 | T(0)–T(1) | 2 |
| 2 | T(1)–T(2) | 2 |
| 2 | T(2)–T(3) | 2 |
| 3 | T(0)–T(1) | 3 |
| 3 | T(1)–T(2) | 3 |

TABLE 2-continued

| Channel | Time Period | Tone Signal |
| --- | --- | --- |
| 3 | T(2)–T(3) | 3 |

The system for demodulation of the tone multiplexing system is shown in FIG. 7 and comprises, in addition to telephone line 26 and isolation transformer 30, the same elements as shown in FIG. 3, for each channel, namely, tone filters 32(1), 32(2), and 32(3) whose output is connected, respectively, to the input side of data recovery networks 35(1), 35(2), and 35(3) whose output is connected to the input side of integrators 49(1), 49(2), and 49(3), respectively, whose output sides are connected to the input sides of analog to digital converters 50(1), 50(2), and 50(3), respectively.

Clock tone filter 33 is connected to master clock data recovery network 57 whose output is connected to both integrators 49(1), 49(2), and 49(3), and analog to digital converters 50(1), 50(2), and 50(3).

Signal tones 1, 2, and 3 which are transmitted over telephone line 26, pass through isolation transformer 30 and are separated to their individual tones by tone filters 32(1), 32(2), and 32(3) such that the output of tone 1 filter 32(1) contains only the signal of tone 1, while the outputs of tone 2 filter 32(2) and tone 3 filter 32(3) contain only their respective signal tones.

In a similar manner, clock tone filter 33 isolates the original clock tone pulse.

As described previously for FIG. 3, tone 1 pulse is converted by data recovery network 35(1) into a square wave pulse of a length corresponding to the original pulse which is then converted to an analog voltage by integrator circuit 49(1) and back to its original digital bundle of bits by analog to digital converter 50(1).

Parallel demodulation for signal tones 2 and 3 are performed in a like manner. Time Zone Multiplexing:

It can be seen from FIG. 6 that there is a considerable period of time between the end of one modulated pulse signal and the next modulated pulse signal, namely, time T(1.25) to T(2) and time T(2.25) to T(3) where there is no signal on telephone line 26.

A circuit for utilizing these periods is shown in FIGS. 8, 9, and 10, but for simplicity, only one tone frequency is used in this example to avoid confusion with frequency multiplexing previously described.

The time zone multiplexing circuit of FIG. 8 comprises digital to analog converters 10(1), 10(2), and 10(3) corresponding, respectively, to channels 1, 2, and 3, whose output sides are respectively connected to sample and hold circuits 59(1), 59(2) and 59(3).

The output sides of sample and hold circuits 59(1), 59(2), and 59(3) are each connected, respectively, to field effect (FET) transistor amplifier switches 61(1), 61(2), and 61(3), whose output sides are combined and connected to the input side of voltage comparator and pulse generating network 11, which, in combination with tone signal oscillator 17 and switch 16, are connected to the input side of amplifier 23, identical to the circuit of FIG. 1.

Time zone multiplex master clock 60 is connected to digital to analog converters 10(1), 10(2), and 10(3) by line K(4) and also sample and hold circuits 59(1), 59(2), and 59(3) by line K(9). Similar to clock 20 in FIG. 1, master clock 60 of FIG. 6 is connected also to voltage comparator and pulse generator network 11 and to switch 21 by line K(5) which controls the output signal from clock oscillator 22 to the input side of amplifier 23. Master clock 60 is also connected, by means of lines K(6), K(7), and K(8), to the control side of FET switches 61(1), 61(2) and 61(3), respectively.

With reference to FIG. 9, the digital information signal from channels 1, 2, and 3, are shown and are identical to the signals on corresponding channels for FIG. 6 such that the tabulation of Table 1 will also apply to FIG. 9.

Tracing the signal of channel 1 in FIG. 9, through the circuit of FIG. 8, the channel 1 signal for the time period T(0)–T(1) enters digital to analog converter 10(1) where, immediately after the detection of the fourth bit of information in the four bit bundle, it is converted to an analog voltage V(1101) corresponding to bit bundle 1101.

The analog voltage is then transmitted to sample and hold circuit 59(1) where, upon command from time zone master clock 60, it is held and released at time T(1) using FET amplifier switch 61(1) to voltage comparator and pulse generator network 11 for modulation, as previously described, into a tone pulse of a particular duration corresponding to the bit bundle sampled.

The clock period of the pulse, as in FIG. 6, has been established as one-quarter of the time period of the original digital input signal.

Thus, for FIG. 9, the tone signal output pulse for the period T(1)–T(1.25) corresponds to the bit bundle of channel 1 for the time period T(0)–T(1).

In a similar manner, the tone signal output pulse for the period T(2)–T2.25) corresponds to the bit bundle of channel 1 for the time period T(1)–T(2).

With respect to channel 2, the signal of channel 2, for the time period T(0)–T(1) enters digital to analog converter 10(2) where, immediately after detection of the fourth bit of information in the four bit bundle, it is converted to an analog voltage V(0011) corresponding to bit bundle 0011.

The analog voltage is then transmitted to sample and hold circuit 59(2) where, upon command from master clock 60, it is held and released at time T(1.33) using FET amplifier switch 61(2) to voltage comparator and pulse generator network 11 for modulation, as previously described, into a tone pulse of a particular duration corresponding to the bit bundle sampled.

With respect to channel 3, the signal of channel 3, for the time period T(0)–T(1) enters digital to analog converter 10(3) where, immediately after detection of the fourth bit of information in the four bit bundle, it is converted to an analog voltage V(1000) corresponding to bit bundle 1000.

The analog voltage is then transmitted to sample and hold circuit 59(3) where, upon command from master clock 60, it is held and released at time T(1.66) using FET amplifier switch 61(3) to voltage comparator and pulse generator network 11 for modulation, as previously described, into a tone pulse of a particular duration corresponding to the bit bundle sampled.

Since three channels are being multiplexed, the time period of the bit bundle has been divided into three time zones T(X), T(Y), and T(Z) each being one-third of the total time period of the bit bundle.

Since the clock period of the signal pulse is one-quarter of the time period of a bit bundle, and, since each time zone is one-third of the time period of the bit bundle, the spacing between clock pulses is, therefore, one-twelfth of the time period of the bit bundle.

The pulse for the bit bundle time period T(0)–T(1) for channel 1 would begin at time T(1).

The pulse for the bit bundle time priod T(0)–T(1) for channel 2 would begin at time T(1.33).

The pulse for the bit bundle time period T(0)–T(1) for channel 3 would begin at time T(1.66).

Therefore, in tabular form, the time zone multiplexed signal would be as shown in Table 3.

TABLE 3

| Channel | Signal Time Period | Time Zone Period | Time Zone Designation |
|---|---|---|---|
| 1 | T(0)–T(1) | T(1)–T(1.33) | X |
| 1 | T(1)–T(2) | T(2)–T(2.33) | X |
| 1 | T(2)–T(3) | T(3)–T(3.33) | X |
| 2 | T(0)–T(1) | T(1.33)–T(1.66) | Y |
| 2 | T(1)–T(2) | T(2.33)–T(2.66) | Y |
| 2 | T(2)–T(3) | T(3.33)–T(3.66) | Y |
| 3 | T(0)–T(1) | T(1.66)–T(2) | Z |
| 3 | T(1)–T(2) | T(2.66)–T(3) | Z |
| 3 | T(2)–T(3) | T(3.66)–T(4) | Z |

Because the time period for FIG. 9 extends only to time T(3), signal and modulated pulses are not shown beyond time T(3).

It can be seen from FIGS. 8 and 9, that sample and hold circuits 59(1), 59(2), and 59(3) together with master clock 60 function as a parallel to series converter, that is, the digital signals entering sample and hold circuits 59(1), 59(2), and 59(3) concurrently, leave the circuits serially in time.

In the present circuit configuration of FIG. 8, sample and hold circuits 59(1), 59(2), and 59(3) are connected after digital to analog converters 10(1), 10(2), and 10(3), respectively, to time zone multiplex the analog signals.

A sample and hold circuit adapted to sample and hold digital information could be connected ahead of digital to analog converters 10(1), 10(2), and 10(3) to act on the unmodulated input signal for each channel to shift each channel in time in order to achieve the same result.

The system for demodulating the time zone multiplexed signal is shown in FIG. 10 and comprises, in addition to telephone line 26 and isolation transformer 30, the same elements as in FIG. 3, namely, tone signal filter 32 whose output is connected to the input side of data recovery network 35, whose output side is, in turn, connected to the input of integrator circuit 49. In a similar manner as in FIG. 3, the output of clock tone filter 33 is connected to time zone multiplexing clock data recovery network 62 whose output is also connected to integrator 49 by a line K(14).

The output of integrator 49, as distinguished from the circuit of FIG. 3, is connected to the input side of FET amplifier switches 65(1), 65(2), and 65(3), respectively, whose output sides are connected, respectively, to the input side of sample and hold circuits 63(1), 63(2), and 63(3), and whose latter three outputs are connected, respectively, to the input side of analog to digital converters 50(1), 50(2), and 50(3) whose outputs correspond, respectively, to the signals on channels 1, 2, and 3.

The signal tone and the clock signal tone output shown in FIG. 9 are received, respectively, at tone signal filter 32 and clock signal filter 33 after passing over telephone line 26 and through isolation transformer 30, where they are discriminated.

The signal tone is converted by data recovery network 35 into a square wave pulse, as previously described, of a duration corresponding to the original signal pulse, converted to an analog voltage by integrator circuit 49 and then transmitted to analog to digital converters 50(1), 50(2), and 50(3), through FET amplifier switches 65(1), 65(2), and 65(3), and then through sample and hold circuits 63(1), 63(2), and 63(3).

In conjunction with FET amplifier switches 65(1), 65(2), and 65(3) the output signal from clock data recovery network 62, distinguishes the three time zones T(X), T(Y), and T(Z) and switches all pulses occuring in time zone T(X) to analog to sample and hold circuit 63(1) and digital converter 50(1), all pulses occuring in time zone T(Y) to analog to sample and hold circuit 63(2) and analog to digital converter 50(2), and all pulses occuring in time zone T(Z) to sample and hold circuit 63(3) and analog to digital converter 50(3).

Thus the serially transmitted pulses are converted into the three respective concurrently occuring signals for each channel.

Combined Frequency and Time Zone Multiplexing:

Taking the example of frequency multiplexing illustrated in FIG. 5, 6, and 7 for the three channels multiplexed to three tones, and taking also the example of time zone multiplexing illustrated in FIG. 8, 9, and 10 for three channels multiplexed on a single tone, FIG. 11, 12, and 13 illustrate a combination of the two methods of multiplexing in which 6 channels of data are multiplexed on two tone frequencies thus tripling the information carrying capacity of a single telephone line when compared with the modulation methods of the prior art.

FIG. 11 is a schematic block diagram of the system for modulating the concurrent signals on the six input channels.

FIG. 12 illustrates the voltage curves as a function of time for the six input signals and modulated tone and time zone multiplexed signal.

FIG. 13 is a schematic block diagram of the system for demodulating the signals back to the six channels of concurrent signals.

With particular reference to FIG. 11, the modulating circuit comprises digital to analog converters 10(1) through 10(6), one for each of the six channels whose output sides are connected to the input side of parallel to series converter 66, whose two outputs are connected to the input sides of modulation networks 19(1) and 19(2), respectively.

The output sides of modulators 19(1) and 19(2) are each connected to the input side of amplifier 23 for amplification and coupling to transformer 25 and telephone line 26.

The input digital signals that are carried on channels one through six are shown in FIG. 12 for three time periods from time T(0) through time T(3), and, as can be seen from FIG. 6 and 9, have been, for the purpose of this example, taken for a four bit bundle.

It will be noted that the input digital signal for channels 1, 2, and 3 are identical to corresponding channels for FIGS. 6 and 9 so that direct comparison can be made.

During the time period T(0)–T(1), the digital signals on all six channels are received by digital to analog converters 10(1) through 10(6) and upon detection of the fourth bit in the four bit series are converted to an analog voltage corresponding to the respective bit bundle, which voltage is transmitted to parallel to series converter 66.

Parallel to series converter 66 performs two functions. It serves as a sample and hold circuit for the analog voltage equivalent of the bit bundles and also serves as a switchyard for routing the analog voltage equivalents of the bit bundles to one of the modulation networks 19(1) or 19(2) during the off time and after the fourth bit. The sample and hold function serves to assign a bit bundle analog voltage to a particular time zone within the time zone multiplexing period while the switchyard function serves to assign the time zone multiplexed analog voltage bit bundles to a particular tone frequency. In the present example, three time zones T(X), T(Y), and T(Z) are used.

Modulation networks 19(1) and 19(2) then convert the analog voltages from the parallel to series converter 66 into pulses of an oscillating wave corresponding to the bit bundle as illustrated in FIG. 12 for tones 1 and 2.

Table 4 illustrates, in tabular form, the location by tone frequency and time zone, each bit bundle unit of information for all six channels.

TABLE 4

| Channel | Bit Bundle | Signal Time Period | Tone | Time Zone Period | Time Zone Designation |
|---|---|---|---|---|---|
| 1 | 1101 | T(0)–T(1) | 1 | T(1)–T(1.33) | X |
| 1 | 0011 | T(1)–T(2) | 1 | T(2)–T(2.33) | X |
| 1 | 1010 | T(2)–T(3) | 1 | T(3)–T(3.33) | X |
| 2 | 0011 | T(0)–T(1) | 2 | T(1)–T(1.33) | X |
| 2 | 0110 | T(1)–T(2) | 2 | T(2)–T(2.33) | X |
| 2 | 0010 | T(2)–T(3) | 2 | T(3)–T(3.33) | X |
| 3 | 1000 | T(0)–T(1) | 1 | T(1.33)–T(1.66) | Y |
| 3 | 1101 | T(1)–T(2) | 1 | T(2.33)–T(2.66) | Y |
| 3 | 1001 | T(2)–T(3) | 1 | T(3.33)–T(3.66) | Y |
| 4 | 1001 | T(0)–T(1) | 2 | T(1.33)–T(1.66) | Y |
| 4 | 1011 | T(1)–T(2) | 2 | T(2.33)–T(2.66) | Y |
| 4 | 0001 | T(2)–T(3) | 2 | T(3.33)–T(3.66) | Y |
| 5 | 0100 | T(0)–T(1) | 1 | T(1.66)–T(2) | Z |
| 5 | 0110 | T(1)–T(2) | 1 | T(2.66)–T(3) | Z |
| 5 | 1100 | T(2)–T(3) | 1 | T(3.66)–T(4) | Z |
| 6 | 0101 | T(0)–T(1) | 2 | T(1.66)–T(2) | Z |
| 6 | 1100 | T(1)–T(2) | 2 | T(2.66)–T(3) | Z |
| 6 | 1011 | T(2)–T(3) | 2 | T(3.66)–T(4) | Z |

It will be noted in Table 4 that the bit bundles for channel 1, bit bundle period T(0)–T(1) and channel 3, bit bundle period T(1)–T(2), are identical. Since they have been modulated to a pulse in tone 1 time zone T(1)–T(1.33) and tone 1 time zone T(2.33)–T(2.66), the two pulses are of equal length.

As for demodulation, FIG. 13 illustrates the circuit for accomplishing this function and, in addition to isolation transformer 30, comprises tone 1 filter 32(1), tone 2 filter 32(2) and clock tone filter 33 whose input sides are all connected to isolation transformer 30.

The output side of filters 32(1) and 32(2) are, respectively, connected to the input side of data recovery networks 35(1), and 35(2) which are in turn connected to integrator circuits 49(1) and 49(2) with the output of each integrator circuit 49(1) and 49(2) connected to series to parallel converter 68, whose six outputs are, respectively, connected to analog to digital converters 50(1) through 50(6).

The output side of clock data recovery network 70, whose input side is connected to filter 33, is connected to both integrator circuits 49(1) and 49(2) and to series to parallel converter 68 in order to time and sequence the flow of information so that the bit bundles are reassembled in proper order.

Similar to the previous examples, the modulated signals as shown for tones 1 and 2, and clock tone output in FIG. 12, are received from line 26 through transformer 30 and applied to the input side of filters 32(1), 32(2), and 33 where the particular tone frequencies are allowed to pass to their respective data recovery networks 35(1), 35(2), and 70.

As previously described, the modulated signals are converted to square wave pulses of a particular length by data recovery networks 35(1) and 35(2) and then converted to an analog voltage value by integrator circuits 49(1) and 49(2) corresponding to the particular bit bundle. This analog signal is then transmitted to series to parallel converter 68.

Converter 68 also performs two functions similar to parallel to series converter 66.

Converter 68 functions both as a sample and hold circuit for separating each bit bundle out of its time zone and as a switchyard by reconstituting bit bundles from the two tone frequencies and time zones into their respective parallel six signal channels.

The reconstituted analog voltage signals are then transmitted to analog to digital converters 50(1) through 50(6), repectively, thereby producing a digital output signal for channels 1 through 6 corresponding to the original input digital signals.

Although FIGS. 11, 12, and 13 illustrate a two tone, three time zone multiplexing arrangement, a greater number of time zones could be used to further multiply the number of input channels that can be compressed into one tone frequency.

If the clock period were reduced to 0.08 of the bit bundle period and the time zone period reduced to 0.10 of the bit bundle period, a ten-fold increase in information carrying capacity can be achieved.

It can also be seen that various permutations and combinations of multiplexing can be achieved by placing bit bundles in a different sequence in the time zones and different order in tone frequencies which can act as a signal or data scrambler.

DETAILS OF PARTICULAR CIRCUITS

Modulator Network

Figure 14:
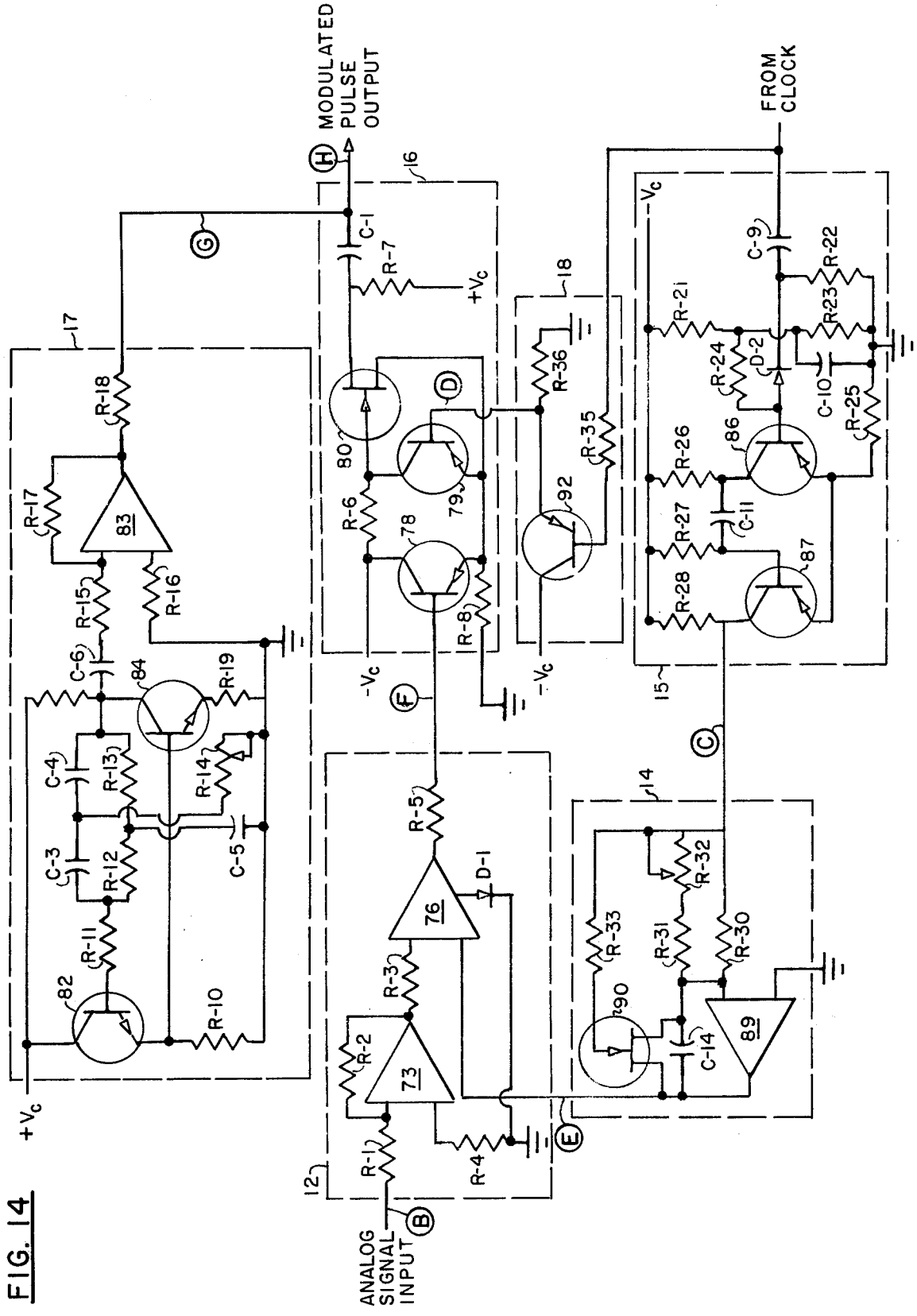
FIG. 14 is a detailed circuit diagram of the modulator of the present invention based on the block diagram of FIG. 1.

Although the function of each element of modulation network 19 (FIG. 1) can be performed with various types of apparatus, a detailed circuit diagram for each element of network 19 is shown in FIG. 14 enclosed in dashed lines and includes voltage comparator 12, integrator circuit 14, pulse generator 15, signal switch 16, signal oscillator 17 and differentiating circuit 18. The letters B through H contained in a circle correspond to the points in the circuit of FIG. 1 and the wave forms of FIG. 2.

The number-letter combination used to identify circuit elements in the following tables are the present industrial standard designation for the semi-conductor or integrated circuit device and are used as examples.

The typical values for circuit elements are given in Table 5 for voltage comparator circuit 12.

TABLE 5

| Voltage Comparator Circuit 12 | |
|---|---|
| Circuit Element | Value or Identification |
| R-1 | 150 K Ohms |
| R-2 | 150 K |
| R-3 | 150 K |
| R-4 | 75 K |
| R-5 | 10 K |
| R-6 | 150 K |
| D-1 | 1N914B |
| Amplifier 73 | LM301H |
| Volt. Comp. 76 | LM301H |

The voltage comparator receives the analog output signal from the digital to analog converter 10 at the input terminals of amplifier 73 (FIG. 14) which serves as an isolation device having one-to-one amplification ratio. The output of amplifier 73 is then applied to the non-inverting side of a high-gain differential amplifier 76 which functions as a comparator by transmitting a positive output signal until the ramp signal from integrator circuit 14, applied to the inverting input of the high gain amplifier 76, is instantaneously equal to the output signal from isolation amplifier 73. At that time, the output from high-gain amplifier 76 goes to the negative supply voltage, hence causing a step voltage to appear at the base of transistor 78 of switch 16.

Typical values and identification for circuit elements for switch 16 are given in Table 6.

TABLE 6

| Switch 16 | |
|---|---|
| Circuit Element | Value or Identification |
| Transistor 78 | 2N2905 |
| Transistor 79 | 2N2905 |
| R-6 | 33 K Ohms |
| R-7 | 43 K |
| R-8 | 510 K |
| C-1 | 10 MFD |
| Transistor 80 | 2N3970 |

In the present circuit configuration of modulation network 19, switch 16 operates in the manner of a short circuiting device for oscillator 17. When the leading edge of the negative going square wave pulse from pulse generator emitter follower output transistor 92 (waveform C in FIG. 2) appears on the base of transistor 79 of switch circuit 16, transistor 79 is turned on and field effect transistor 80 is caused to become non-conductive. Thus the load applied to oscillator 17 is caused by R-7 (43 K Ohms) and the impedance of capacitance C-1. When voltage comparator 76 changes state providing a negative step voltage to appear on the base of transistor 78 of switch 16, transistor 79 is turned off, hence field effect transistor 80 is caused to conduct permitting the output of oscillator 17 to be connected through the YDS (admittance of the on condition of the transistor) value of field effect transistor 80 (a very low resistance) and capacitor C-1 effectively shorting the output of oscillator 17 to ground.

Typical values and identification for circuit elements for oscillator 17 are given in Table 7.

TABLE 7

| Oscillator 17 | |
|---|---|
| Circuit Element | Value or Identification |
| Transistor 82 | 2N2219 |
| Transistor 84 | 2N2219 |
| Amplifier 83 | 2M301H |
| R-10 | 0–1 K (for 425–2805 Hz) |
| R-11 | 24 K |
| R-12 | 12 K |
| R-13 | 12 K |
| R-14 | 2 K |
| R-15 | 150 K |
| R-16 | 150 K |
| R-17 | 460 K |
| R-18 | 1 K |
| R-19 | 51 Ohms |
| C-3 | See Text |
| C-4 | See Text |
| C-5 | See Text |
| C-6 | 1 MFD |

Oscillator 17 is a standard design well known to the individual skilled in the art of twin-T oscillator design. The frequency output desired of such a twin-T oscillator is controlled by the resistances R-12, R-13, R-14 and the capacitances C-3, C-4 and C-5. In this particular oscillator 17, the values of R-12 and R-13 are held constant, and the frequency is determined by the value of C-3, C-4 and C-5, where C31 equals C-4 equals one-half C-5. Potentiometer resistance R-14 is used for fine tuning these basic oscillator frequencies to exactly center the band of each desired frequency band. Resistance R-10 is adjusted at each frequency to provide a perfect sine wave. For a frequency range of 425 to 2805 Hz, the capacitance values will be approximately as shown in Table 8.

TABLE 8

| Frequency Hz | C-3 MFD | C-4 MFD | C-5 MFD |
|---|---|---|---|
| 2805 | .01 | .01 | .022 |
| 2635 | .01 | .01 | .022 |
| 2465 | .01 | .01 | .022 |
| 2295 | .01 | .01 | .022 |
| 2125 | .01 | .01 | .022 |
| 1955 | .01 | .01 | .022 |
| 1785 | .015 | .015 | .033 |
| 1615 | .015 | .015 | .033 |
| 1445 | .015 | .015 | .033 |
| 1275 | .015 | .015 | .033 |
| 1105 | .015 | .015 | .033 |
| 935 | .015 | .015 | .033 |
| 765 | .033 | .033 | .068 |
| 595 | .033 | .033 | .068 |
| 425 | .047 | .047 | .068 |

Typical values and identification for circuit elements for pulse generator 15 and differentiating circuit 18 are given in Table 9.

TABLE 9

| Pulse Generator 15 and Differentiating Circuit 18 | |
|---|---|
| Circuit Element | Value or Identification |
| Transistor 86 | 2N2905 |
| Transistor 87 | 2N2905 |
| Transistor 92 | 2N2905 |
| R-23 | 1 K |
| R-24 | 2.4 K |
| R-25 | 510 Ohms |

TABLE 9-continued

| | Pulse Generator 15 and Differentiating Circuit 18 | |
|---|---|---|
| Circuit Element | | Value or Identification |
| R-26 | | 43 K |
| R-27 | | 150 K |
| R-28 | | 15 K |
| R-35 | | 1 K |
| R-36 | | 330 K |
| C-9 | | .01 MFD |
| C-10 | | 1.0 MFD |
| C-11 | | See Text |
| D-2 | | 1N914 |

Pulse generator 15 is a mono-stable multivibrator, the basic design of which is well known in the art. This particular pulse generator creates a square wave of a duration equal to the clock time period, that is, the window "through which the modulated pulse must appear". In practice, when the modulated signal will be transmitted over telephone lines, the clock pulse window is of the order of 10 msec. Capacitor C-11 is the controlling circuit element for determining the pulse length of the pulse generator.

A typical value for C-11 is 2.5 MFD, which corresponds to a pulse length of about 170 msec. from pulse generator 15. For the particular circuit elements of Table 9, the approximate time constant is determined by the following equation:

$$0.32(R\text{-}27 + R\text{-}36)(C\text{-}11) = T(c)$$

Typical values and identification for circuit elements for integrator 14 are given in Table 10.

TABLE 10

| Circuit Element | Integrator 14 Value or Identification |
|---|---|
| Amplifier 89 | LM301H |
| Transistor 90 | 2N4222 |
| R-30 | 150 K |
| R-31 | 150 K |
| R-32 | 0–500 K |
| R-33 | 10 K |
| C-14 | See Text |

Integrator circuit 14 receives the incoming square wave from pulse generator 15 and converts it to a positive ramp voltage from 0 to the maximum voltage output of amplifier 73 of circuit 12, at the same instant as the end of the window indicated by the trailing edge of the pulse from pulse generator 15. In essence integrator circuit 14 performs the mathematical operation of integration. This circuit is essentially a low-pass filter with a frequency response decreasing at 6 db per octave. In order that this circuit perform the mathematical operation of integration, the initial conditions must be set whereby the voltage across capacitor C-1 is zero at the onset of the square wave forming window. This is accomplished through the use of field effect transistor 90 and resistance R-33. The combination of resistance value formed by resistors R-30, R-31 and R-32 and capacitor C-14, determine the output voltage at the end of the ramp at the instant the window closes, and obey the characteristics of the following equations:

$$V(out) = \frac{1}{((R\text{-}31+R\text{-}32)(R\text{-}30)/(R\text{-}31+R\text{-}32+R\text{-}30))\,C\text{-}1} \int_{t(0\text{ window})}^{t(\max\text{ window})} V(in)\,dt$$

where $$f(c) = \frac{1}{2(3.1416)((R\text{-}31+R\text{-}32)(R\text{-}30)/(R\text{-}31+R\text{-}32+R\text{-}30))C\text{-}1}$$

Figure 15:
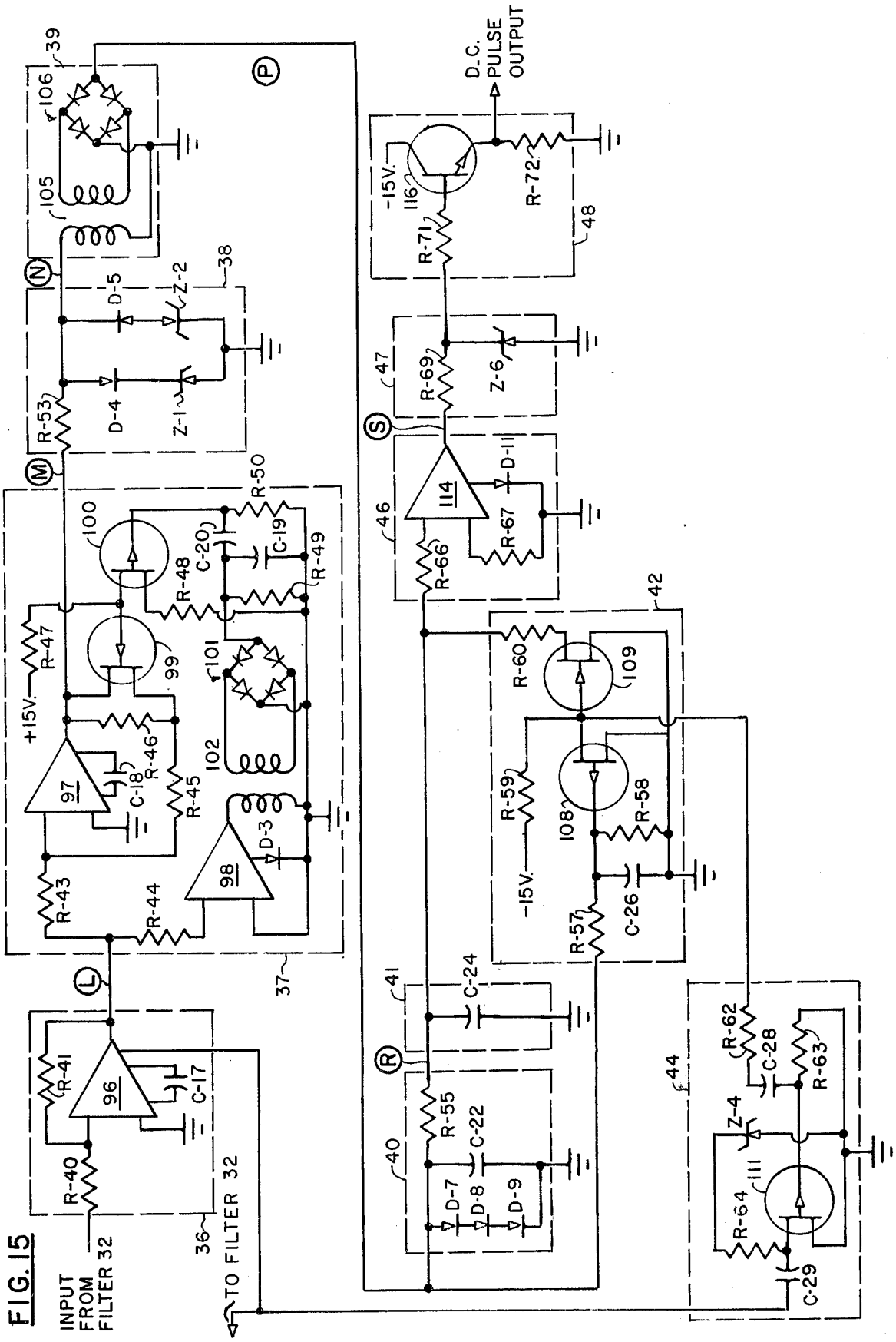
FIG. 15 is a detailed circuit diagram of the demodulator of the present invention based on the block diagram of FIG. 4.

Data Recovery Network:

The basic circuit elements of data recovery network 35 for the demodulation circuit of FIG. 3 are shown in detail in FIG. 15 and comprise, as previously described for FIG. 3, enclosed in dashed lines, signal amplifier 36, signal compensator 37, sine-wave clipper 38, rectifier 39, first smoothing filter 40, second smoothing filter 41, pulse end detector 42, ring-down eliminator 44, voltage comparator 46, voltage matching circuit 47 and impedance matching circuit 48.

The letters L through S contained in a circle correspond to the points in the circuit of FIG. 3 and the wave forms of FIG. 4.

Typical values for the circuit elements of signal amplifier 36 are given in Table 11.

TABLE 11

| Circuit Element | Signal Amplifier 36 Value or Identification |
|---|---|
| Amplifier 96 | LM301H |
| R-40 | 0.62 K |
| R-41 | 680 K |
| C-17 | 30 pfd |

Amplifier 96 is a standard form of integrated circuit using a field effect transistor strobe input. The output from ring-down eliminator 44 is connected to the strobe input of the amplifier. The effect is to clamp off the feedback loop and drive the amplification to unity upon detection of ring-down. Otherwise, amplifier 96 performs its normal amplifying function.

Typical values for the circuit elements of signal compensator 37 are given in Table 12.

TABLE 12

| Circuit Element | Signal Compensator 37 Value or Identification |
|---|---|
| Amplifier 97 | LM301H |
| Amplifier 98 | LM301H |
| Transistor 99 | 2N3970 |
| Transistor 100 | UC470 |
| Transformer 102 | See Text |
| Rectifier 101 | 18DB6A |
| R-43 | 10 K |
| R-44 | 150 K |
| R-45 | 10 K |
| R-46 | 100 K |
| R-47 | 43 K |
| R-48 | 150 K |
| R-49 | K |
| R-50 | 10 Meg |
| C-18 | 3 pfd |
| C-19 | 1 MFD |
| C-20 | .001 MFD |
| D-3 | 1N914B |

Signal compensator circuit 37 serves to amplify and clip the leading portion of the signal pulse of curve L (FIG. 4) to compensate for the distortion of the pulse due to transmission line impedances. The output of circuit 37 is shown in curve M (FIG. 4).

The characteristics of transformer 102 will depend upon the tone frequency of the pulse and is intended to have a 1:1 transformation ratio for the normal tone frequency used on direct distance dialing telephone circuits with a flat response from 100 Hz–10 KHz and balanced winding to 60 db. The total input impedance should be about 600 ohms. At higher frequencies, an active half wave rectifier would be substituted for transformer 102 and bridge rectifier 101.

Typical values for the circuit elements of sine wave clipper 38 are given in Table 13.

TABLE 13

| Sine Wave Clipper 38 | |
|---|---|
| Circuit Element | Value or Identification |
| Diode D-4 | 1N914B |
| Diode D-5 | 1N914B |
| Zener Diode Z-1 | 1N4735 |
| Zener Diode Z-2 | 1N4735 |
| R-53 | 750 Ohms |

Zener diodes Z-1 and Z-2 are selected to establish the height of the clipped wave.

Typical values and identification of the circuit elements of rectifier circuit 39 are given in Table 14.

TABLE 14

| Rectifier Circuit 39 | |
|---|---|
| Circuit Element | Value or Identification |
| Transformer 105 | See Text |
| Rectifier 106 | 18 DB6A |

Similar to transformer 102 of circuit 37, the design of transformer 105 of circuit 39 will depend upon the tone frequency of the pulse. It should have a 1:1 transformation ratio and, for the normal tone frequencies used on telephone circuits, its response should be flat from 100 Hz–10 KHz and have balanced windings to 60 db. The total output impedance should not exceed 600 ohms.

Typical values for the circuit elements of first smoothing filter 40 are given in Table 15.

TABLE 15

| First Smoothing Filter 40 | |
|---|---|
| Circuit Element | Value or Identification |
| R-55 | 1 K |
| C-22 | .06 MFD |
| D-7 | 1N4002 |
| D-8 | 1N4002 |
| D-9 | 1N4002 |

Typical values for the circuit elements of second smoothing filter 41 are given in Table 16.

TABLE 16

| Second Smoothing Filter 41 | |
|---|---|
| Circuit Element | Value or Identification |
| C-24 | 0.33 MFD |

Typical values for the circuit elements of pulse end detector 42 are given in Table 17.

TABLE 17

| Pulse End Detector 42 | |
|---|---|
| Circuit Elements | Value or Identification |
| Transistor 108 | UC470 |
| Transistor 109 | 2N3970 |
| R-57 | 27 K |
| R-58 | 11 K |
| R-59 | 43 K |
| R-60 | 39 Ohms |

TABLE 17-continued

| Pulse End Detector 42 | |
|---|---|
| Circuit Elements | Value or Identification |
| C-26 | 0.082 MFD |

The circuit elements have been sized to detect a drop of about 67% in the voltage at the trailing edge of the pulse by measuring the difference signal across smoothing filters 40 and 41. When the drop is detected, a signal is transmitted to ring-down eliminator circuit 44.

Typical values and identification of the circuit elements of ring-down eliminator circuit 44 are given in Table 18.

TABLE 18

| Ring-down Eliminator 44 | |
|---|---|
| Circuit Element | Value or Identification |
| Transistor 111 | UC470 |
| Zener Diode Z-4 | 1N4733 (temperature compensated) |
| R-62 | See Text |
| R-63 | See Text |
| R-64 | 4.6 K |
| C-28 | See Text |
| C-29 | 1.0 MFD |

Zener diode Z-4 establishes a 6.3 volt level to ground. The output of ring-down eliminator 44 is transmitted to amplifier 96 as previously described to reduce its amplification to zero immediately upon detection of a 63% drop in voltage at the end of the signal pulse.

The values of R-62, R-63, and C-28 will depend upon the tone frequency. For example, at a tone frequency of 2261 Hz, R-62 = 10 K, R-63 = 10 K, and C-18 = 0.028 MFD.

Typical values and identification of circuit elements of voltage comparator circuit 46 are given in Table 19.

TABLE 19

| Voltage Comparator Circuit 46 | |
|---|---|
| Circuit Element | Value or Identification |
| Voltage Comparator 114 | 2M301H |
| R-66 | 10 K |
| R-67 | 10 K |
| D-11 | 1N914B |

The comparison voltage for circuit 46 is set at 0.1 of the output voltage from second smoothing filter 41 so as to create a more nearly square wave output from circuit 46.

Typical values and identification of circuit elements of voltage matching circuit 47 are given in Table 20.

TABLE 20

| Voltage Matching Circuit 47 | |
|---|---|
| Circuit Element | Value or Identification |
| R-69 | 2 K |
| Zener Diode Z-6 | 1N4740 (temperature compensated) |

Voltage matching circuit 47 has, for the purpose of this example, been set for a voltage level of 10 volts using zener diode Z-6. 10 volts is the normal business machine voltage. Other voltages can be established depending upon the purpose to which the output is used.

Typical values and identification of the circuit elements of impedance matching circuit 48 are given in Table 21.

TABLE 21

| Impedance Matching Circuit 48 | |
|---|---|
| Circuit Element | Value or Identification |
| Transistor 116 | 2N2219 |
| R-71 | 5.1 K |
| R-72 | 1.0 K |

The output from impedance matching circuit 48 is taken at the emitter of transistor 116.

Parallel to Series Converter

In the circuit of FIG. 11, the six channels have concurrent or parallel signals being received from the six digital to analog converters 10(1) through 10(6).

To convert the six concurrent or parallel received signals into serially transmitted signals on two tone frequencies, a parallel to series converter 66 is employed which is connected between the six digital to analog converters 10(1) through 10(6) and the two voltage comparator and pulse generator networks 11(1) and 11(2).

Figure 16:
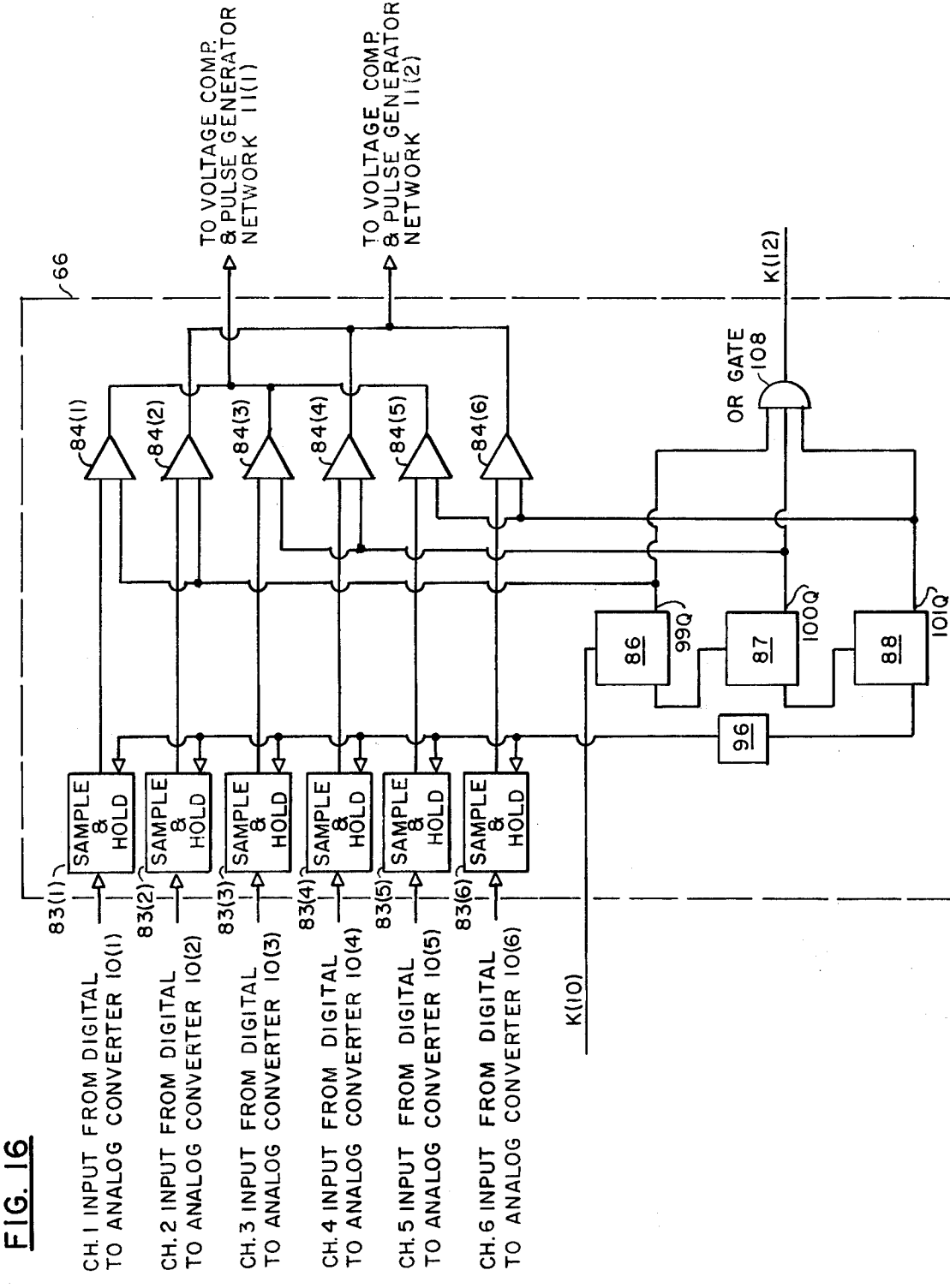
FIG. 16 is a schematic block diagram of the parallel to series converter of FIG. 11.

FIG. 16 illustrates parallel to series converter 66 in greater detail and comprises sample and hold circuits 83(1) through 83(6) corresponding to the respective six input channels, field effect transistor (FET) amplifier switches 84(1) through 84(6), the circuit of which is described in greater detail below, also corresponding to the respective six input channels having one input side connected, respectively, to the output side of sample and hold circuits 83(1) through 83(6) with the other input side connected to the positive pulse output side of gating circuits 86, 87 and 88, namely, switches 84(1) and 84(2) connected to gating circuit 86; switches 84(3) and 84(4) connected to gating circuit 87; and switches 84(5) and 84(6) connected to gating circuit 88.

Parallel to series converter 66 also includes differentiating circuit 96 arranged to reset circuits 83(1) through 83(6) as well as an OR gate 108 arranged to operate as described hereinafter.

Gating circuits 86, 87, and 88 are cascaded to provide the three consecutive time zones T(X), T(Y), and T(Z) within the time period of the bit bundle.

Figure 17:
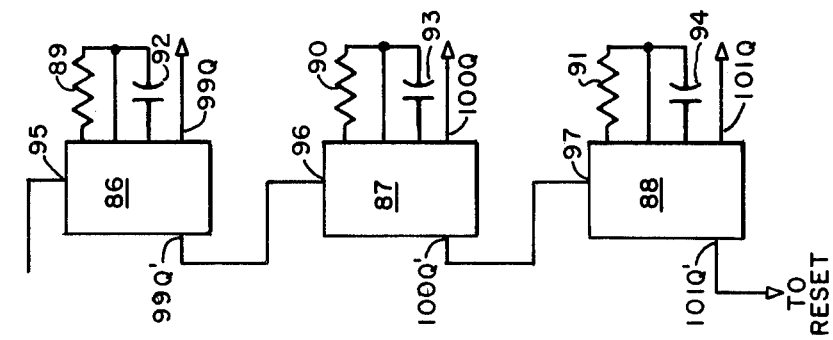
FIG. 17 is a schematic block diagram of the gating circuit used in the parallel to series converter of FIG. 16.

Referring to FIG. 17, time zone gating circuits 86, 87, and 88 are shown in somewhat greater detail with each circuit further comprising a timing resistor 89, 90, and 91, respectively, and a timing capacitor 92, 93, and 94, respectively, connected exterior to the circuit and which can be varied according to the output pulse length required. In the present example, the pulse length desired is one-third of the bit bundle period.

The time period for the time zone gating circuits are determined by the use of the following equation:

$$T(c) = 0.32RC(1 + 0.7/k)$$

where:

T(c) = pulse length or period.

R = resistance value in ohms of resistance 89, 90 or 91.

C = capacitance value in microfarads of capacitor 92, 93 or 94.

Each gating circuit 86, 87, and 88 comprises, respectively, a positive pulse output side 990, 1000, and 1010 and a negative pulse or reciprocal output side 990′, 1000′ and 1010′.

It is the characteristic of each time zone gating circuit that a positive going or rising voltage applied to its input side causes the circuit to generate concurrent complementary output pulses on its two output sides.

Figure 18:
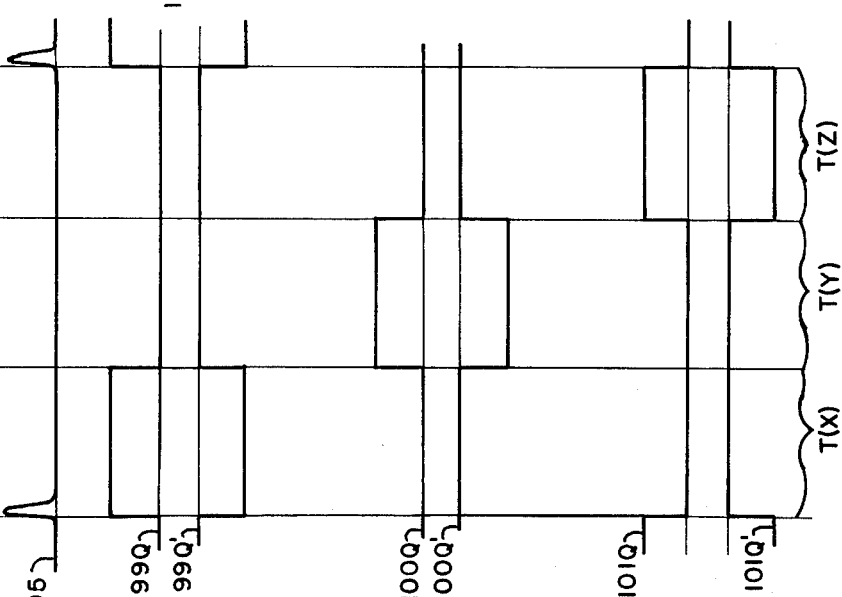
FIG. 18 is a series of graphs of wave shapes of the input and output signals of the gating circuits of FIG. 17.

FIG. 18 illustrates such pulses for the time period T(1) to T(2) which would be a typical bit bundle period. The reference numerals associated with each curve correspond to the input side of circuit 86 and output sides of circuits 86, 87, and 88.

With reference to FIG. 18, the input voltage signal to time zone T(X) gating circuit 86 is shown by curve 95 in which a positive going voltage pulse occurs at time T(1). This pulse is generated by master time clock 67 of FIG. 11 which also controls the timing of the bit bundle period and the gating of the digital data from channels 1 through 6 into digital to analog converters 10(1) through 10(6).

The pulse of curve 95 occurs immediately after all digital to analog converters have generated their analog voltages and transmitted these analog voltages to sample and hold circuits 83(1) through 83(6).

Since time zone T(X) gating circuit 86 will generate a pulse on a rising or positive going voltage, the leading edge of the pulse of curve 95 causes time zone T(X) gating circuit 86 to generate two pulses as shown in curves 990 and 990′.

The output pulse of curve 990 is applied to one side of FET amplifier switches 84(1) and 84(2) permitting the analog voltage information from sample and hold circuits 83(1) and 83(2) to be applied to the input sides of voltage comparator and pulse generator networks 11(1) and 11(2) (FIG. 11), respectively, generating modulated pulses on tones 1 and 2, respectively, during time period T( ) to T(1.33).

The output pulse of curve 990′ is applied to input side 96 of time zone T(Y) gating circuit 87, and since circuit 87 will generate a pulse on a rising or positive going voltage, the trailing edge of the pulse of curve 990′, which rises or goes positive at time T(1.33), will cause circuit 87 to generate two complementary pulses as shown in curves 1000 and 1000′.

The output pulse of curve 1000 is applied to one side of FET amplifier switches 84(3) and 84(4) permitting the analog voltage information from sample and hold circuits 83(3) and 83(4), respectively, to be applied to the input sides of voltage converter and pulse generator networks 11(1) and 11(2), respectively, during time period T(1.33) to T(1.66).

The output pulse of curve 1000′ is applied to the input side 97 of time zone T(Z) gating circuit 88 and since circuit 88 will generate a pulse on a rising or positive going voltage, the trailing edge of the pulse of curve 1000′, which rises or goes positive at time T(1.66), will cause circuit 88 to generate two pulses as shown in curves 1010 and 1010′.

The output pulse of curve 1010 is applied to one side of FET amplifier switches 84(5) and 84(6) permitting the analog voltage information from sample and hold circuits 83(5) and 83(6), respectively, to be applied to the input sides of voltage converter and pulse generator networks 11(1) and 11(2), FIG. 11, respectively, during time period T(1.66) to T(2).

The output pulse of curve 1010′ is applied to the input side of differential circuit 96 whose output pulse is applied to the reset side of sample and hold circuits 83(1) through 83(6) to cause them to discharge and be reset to receive analog information for the next bit bundle period.

Series to Parallel Converter

In the circuit of FIG. 13, the two tone frequencies carry the serially multiplexed modulated signals which are converted back to their analog equivalent by data recovery networks 35(1) and 35(2).

To convert the serially transmitted signals on the two tones into concurrent or parallel received signals on six output channels, a series to parallel converter 68 is employed which is connected between the two data recovery networks 35(1) and 35(2) and the six analog to digital converters 50(1) through 50(6).

With reference to FIG. 19, series to parallel converter 68 is shown in greater detail and comprises FET amplifier switches 103(1) through 103(6), corresponding to channels 1 through 6, respectively, whose output sides are connected to the input sides of sample and hold circuits 104(1) through 104(6), respectively.

The output sides of sample and hold circuits 104(1) through 104(6) are connected to the input sides of analog to digital converters 50(1) through 50(6), respectively, (FIG. 13).

Series to parallel converter 68 further comprises time zone T(X') gating circuit 86', time zone T(Y') gating circuit 87', and time zone T(Z') gating circuit 88' corresponding in type, design and connection to gating circuits 86, 87, and 88 of FIGS. 16 and 17.

Since the time zone gating circuits of FIG. 16 and 17 for parallel to series converter 66 are identical to the time zone gating circuits for series to parallel converter 68, the reference numerals can be interchangeable. However, when referring to the time zone gating circuits for series to parallel converter 68, the reference numerals will be primed. For example, output side of gating circuit 86' will be designated 99'Q and 99'Q' which correspond to the output sides 99Q and 99Q' of gating circuit 86. The curves of the voltage pulses will be designated in the same manner.

Output side 99'Q of time zone T(X') gating circuit 86' is connected to one input side of FET amplifier switches 103(1) and 103(2). Output side 100'Q of time zone T(Y') gating circuit 87' is connected to one input side of FET amplifier switches 103(3) and 103(4), while output side 101'Q of time zone T(Z') gating circuit 88' is connected to one input side of FET amplifier switches 103(5) and 103(6).

The other input side of FET amplifier switches 103(1), 103(3), and 103(5) are combined and connected to the output side of data recovery network 35(1) of FIG. 13. The other input side of FET amplifier switches 103(2), 103(4), and 103(6) are combined and connected to the output side of data recovery network 35(2).

Gating circuits 86', 87', and 88' are connected and operate in the identical manner as gating circuits 86, 87, and 88 of FIG. 17 with the same type of input and output voltage wave shapes as shown in the curves of FIG. 18.

With reference to FIGS. 17 and 18, as applied to the circuit shown in FIG. 19, the input pulse of curve 95', which is generated by master clock data recovery network 70 from the time signal transmitted concurrently with the modulated signal, is applied to the input side 95' of time zone T(X') gating circuit 86'.

Similar in operation to that described for gating circuits 86, 87, and 88, the pulses of curves 99'Q, 100'Q, and 101'Q are generated for time zones T(X'), T(Y'), and T(Z') which 1. permit FET amplifier switches 103(1) and 103(2) to transmit the analog voltage signal from data recovery networks 35(1) and 35(2), respectively, to sample and hold circuits 104(1) and 104(2), respectively, during time priod T(1) to T(1.33), i.e. time zone T(X');

2. permit FET amplifier switches 103(3) and 103(4) to transmit the analog voltage signal from data recovery networks 35(1) and 35(2), respectively, to sample and hold circuits 104(3) and 104(4), respectively, during time period T(1.33) to T(1.66), i.e. time zone T(Y'); and 3. permit FET amplifier switches 103(5) and 103(6) to transmit the analog voltage signal from data recovery networks 35(1) and 35(2), respectively, to sample and hold circuits 104(5) and 104(6), respectively, during time period T(1.66) to T(2), i.e. time zone T(Z').

Figure 22:
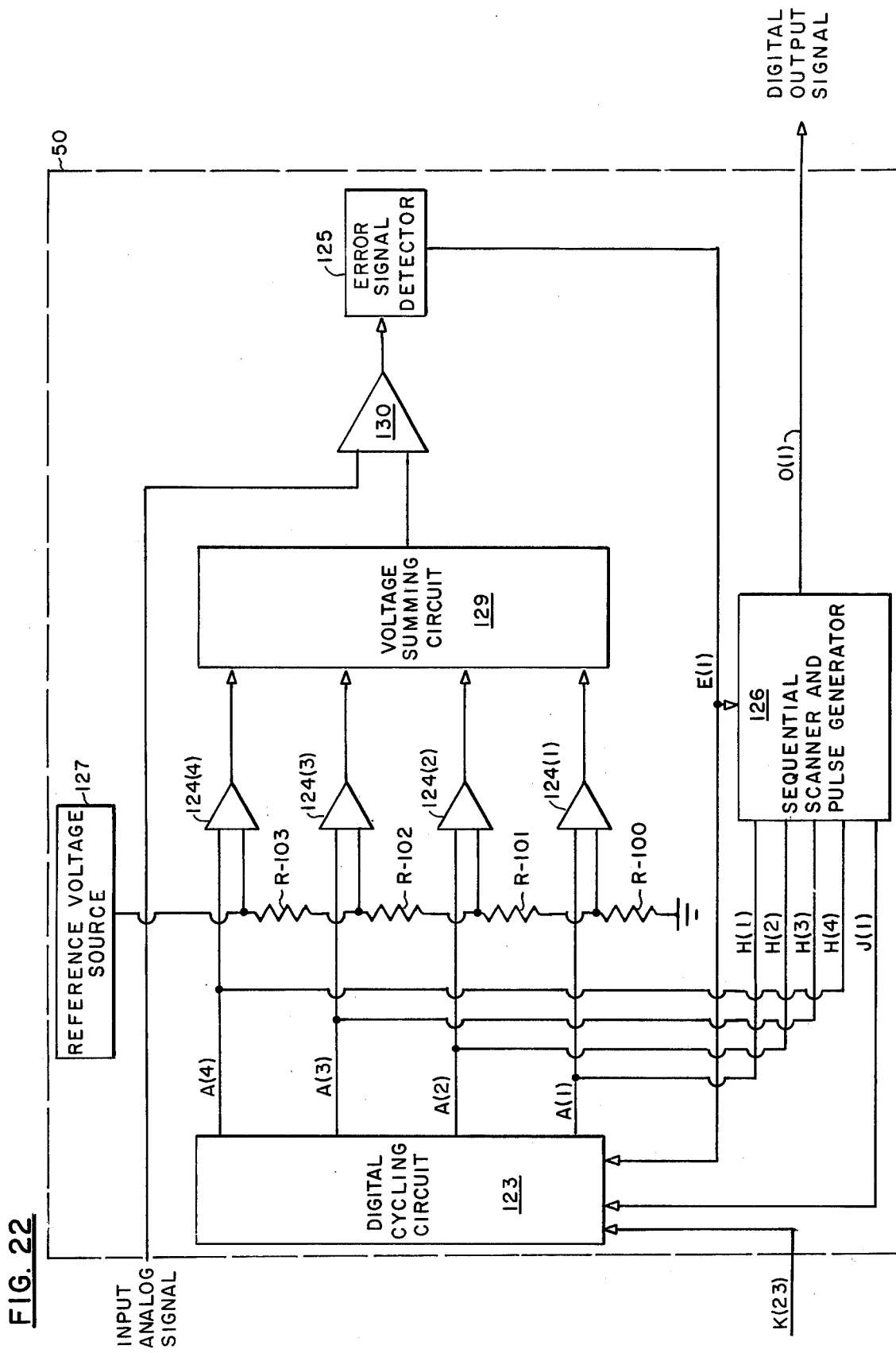
FIG. 22 is a schematic block diagram of a typical analog to digital converter.

As soon as all sample and hold circuits 104(1) through 104(6) are holding an analog voltage signal, which occurs immediately after time T(1.66), the analog signal for each sample and hold circuit 104(1) through 104(6) is simultaneously transmitted to analog to digital converters 50(1) through 50(6) (FIG. 13), respectively, where the analog voltage is converted to its corresponding digital information equivalent as described for FIG. 22.

At time T(2), all sample and hold circuits 104(1) through 104(6) are reset to zero by the pulse of curve 101'Q to begin receiving the analog signals for the next bit bundle period.

Sample and Hold Circuit

The circuits identified as sample and hold circuits in FIG. 8, circuit 59(1) through 59(3); FIG. 10, circuit 63(1) through 63(3); FIG. 16, circuit 83(1) through 83(6); and FIG. 19, circuits 104(1) through 104(6) are shown in greater detail in FIG. 20.

The sample and hold circuits for all the above Figures are identical and comprise an input resistor R-80 connected to one input side of amplifier 120, a grounding resistor R-81 connected to the other input side of amplifier 120, a diode D-16 connected in series with resistor R-83 connecting the output of amplifier 120 with one input side of amplifier 121. The point of connection of resistor R-83 to diode D-16 is grounded by parallel circuits, one circuit being through capacitor C-40 and the other circuit being through field effect transistor 106 whose gate is connected to reset resistor R-84.

A resistor R-82 is connected between the amplifier side of input resistor R-80 and the output side of amplifier 121.

A diode D-15 is connected across the input side of amplifier 120.

The other input side of amplifier 121 is connected to the output side of amplifier 121.

Figure 20:
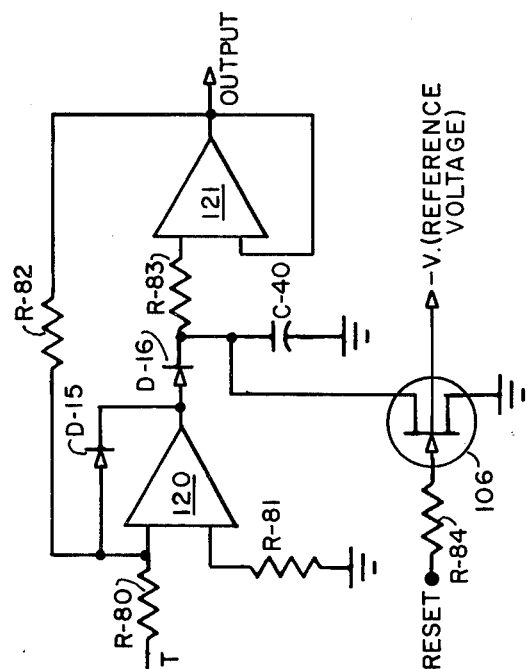
FIG. 20 is a circuit diagram of a typical sample and hold circuit.

The typical values for the circuit elements of the sample and hold circuit of FIG. 20 are given in Table 22.

TABLE 22

| Sample and Hold Circuits | |
|---|---|
| Circuit Element | Value or Identification |
| Amplifier 120 | LM301 |
| Amplifier 121 | W740 |
| Transistor 106 | 2N3819 |
| R-80 | 10 K |
| R-81 | 7.5 K |
| R-82 | 20 K |
| R-83 | 10 K |

TABLE 22-continued

| Sample and Hold Circuits | |
|---|---|
| Circuit Element | Value or Identification |
| R-84 | 43 K |
| C-40 | 1 MFD |
| D-15 | 1N4002 |
| D-16 | 1N4002 |

When an input analog voltage is applied to the input side of resistor R-80, the voltage value is maintained by the unity amplification ratio or gain of amplifier 120 and applied to the junction of diode D-16, resistor R-83, capacitor C-40 and one side of transistor 106 to charge capacitor C-40 to the analog voltage representing the input digital bit bundle.

Because of the relatively high back resistance of diodes D-15, D-16, and amplifier 120 and the relatively high forward resistance of resistor R-83, amplifier 121 and field effect transistor 106, the charge on capacitor C-40 will be maintained for a period of time depending upon the value of R-83, the input impedance of amplifier 121 and C-40.

The time constant for the circuit, in accordance with well known principles is a function of the resistance R-83, which is about 20 megohms, multiplied by the value of capacitance C-40.

For the values of resistance and capacitance given in Table 22, the time constant will be of the order of seconds which will normally be much longer than the storage or the bit bundle period.

Upon application of a negative voltage to the reset side of reset resistor R-84, field effect transistor 106 becomes conductive and capacitor C-40 will discharge to ground reducing its voltage to zero preparatory to receiving another analog signal to hold until used.

Master Clocks and Timing Circuits

With respect to all modulation circuits, time clock 20 of FIG. 1, master time clock 55 of FIG. 5, master time clock 60 of FIG. 8 and master time clock 67 of FIG. 11 all perform the following basic functions:

1. Generate the timing pulse for gating the analog signal to the voltage comparator and pulse generating network.

2. Generate the timing pulse for gating the clock oscillator tone timing signal to the line for transmission as a multiplexed tone concurrently with the modulated and multiplexed information signal.

In FIG. 8, master clock 60 performs the additional function of gating the information from sample and hold circuits 59(1) through 59(3) to voltage comparator and pulse generator 11 and reseting circuits 59(1) through 59(3) to zero.

In FIG. 11, master clock 67 performs the additional function of providing the actuating pulse to initiate cascade operation of time zone gating circuits 86, 87, and 88 (FIGS. 16, 17, and 18).

As will be described in detail below for digital to analog converter 10 of FIG. 21, input signal register 114 establishes the bit bundle size, in the present embodiment a four bit bundle is used although other bit bundle sizes can be used.

In certain instances, such as an intermittent digital input signal, for any bit bundle size, care must be taken to not lose the input digital information word encoding sequence.

For Example, if a four bit word encoding combination is used for the input signal, the first bit of the four bit word should coincide with the first bit of the four bit bundle. To achieve this, a parity bit can be associated with each four-bit word to identify it as a word which should be grouped into a four-bit bundle. The parity bit could, for example, be a pulse of a different length than the signal bit pulse with input register 114 adapted to detect such a pulse length.

If an eight bit word is to be used, the parity bit can be associated with the eight bit word to group it into two four-bit bundles.

The requirement for a parity bit would exist when the incoming signal is of a type in which no pulses would occur, that is, the line would be "dead" when no information is being transmitted.

The parity bit would not be required if a "no information" signal consists of a continuous input signal of negative pulses indicating a stream of 0 bits. Such a signal, when received at input register 114 of digital to analog converter 10, would be grouped into a bit bundle 0000 and result in a zero analog voltage output from digital to analog converter 10 and therefore no pulse output from modulation circuit 19. This would take care of the situation where the number of bits at the end of the incoming information carrying signal are less than the bit bundle size. For example, at the end of an incoming digital signal, the last incoming information carrying bits may be a fraction of the total bit bundle size. Without the 0 bits indicating no information, input signal register 114 would not be filled. The 0 bits thus complete the filling of the register.

That is not to say that the communication system of the present invention will not work without a parity bit or no information signal, however, transmission errors will be reduced if such items are used when the input digital signal is intermittent in character.

Figure 21:
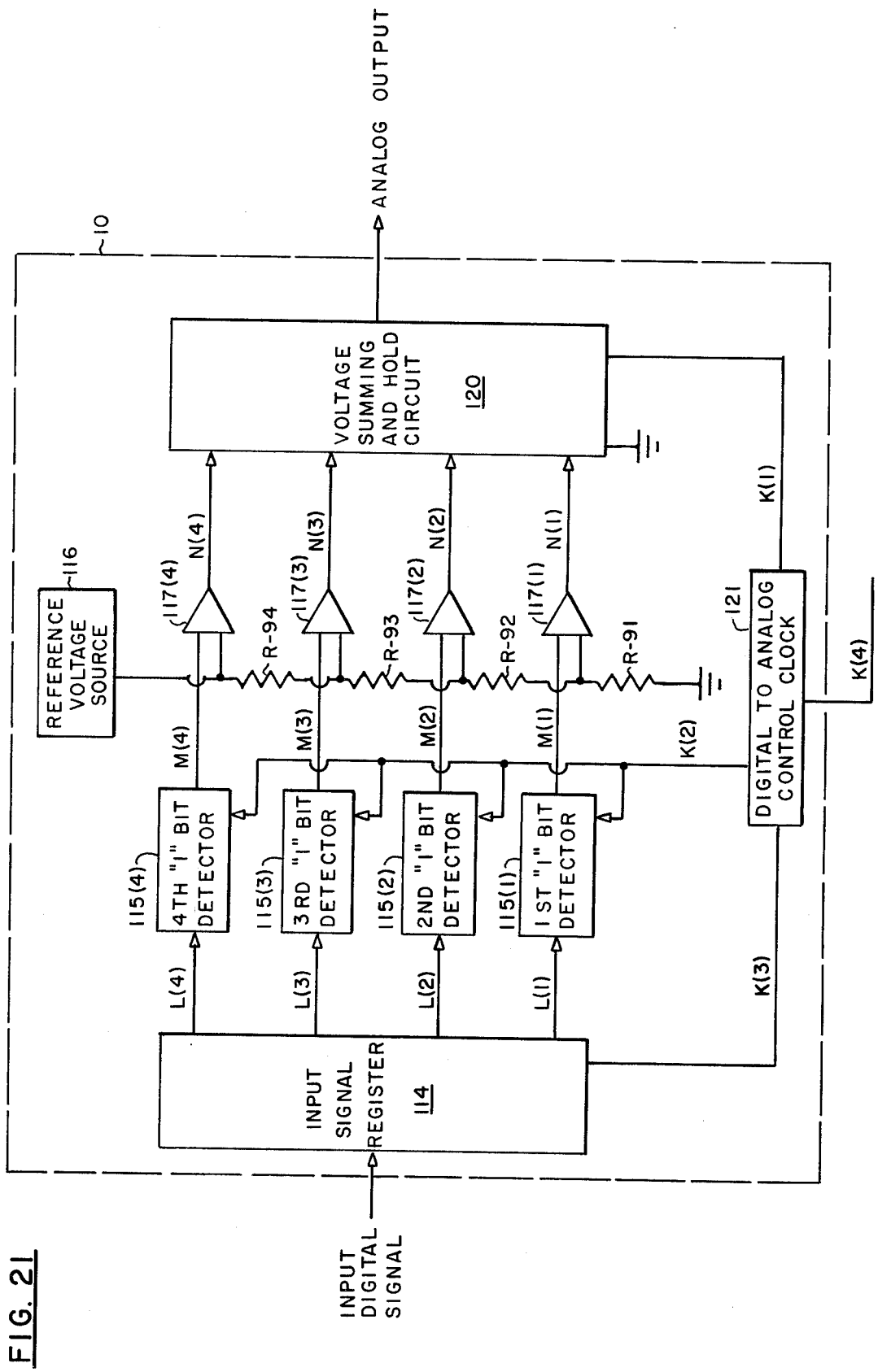
FIG. 21 is a schematic block diagram of a typical digital to analog converter.

Upon receipt of the fourth bit, in the present embodiment, of the four bit series, a signal is generated by input register 114 and transmitted to digital to analog clock 121 through line K(3) (FIG. 21). Digital to analog clock 121 immediately initiates a pulse or timing signal through line K(1) (FIG. 21) to voltage summing and hold circuit 120 which gates the analog output of circuit 120 to the next circuit element (in FIGS. 1 and 5, to voltage comparator 11; in FIG. 8, to sample and hold circuit 59; in FIG. 11, to parallel to series converter 66), and concurrently generates a pulse or signal through line k(4) to the master clock (in FIG. 1, clock 20; in FIG. 5, master clock 55; in FIG. 8, master clock 60; in FIG. 11, master clock 67).

Immediately after the gating of the analog data out of voltage summing and hold circuit 120 but before receipt of the next bit (the first bit of the next four bit series) of the input signal, digital to analog control clock 121 generates a pulse or signal which is transmitted to bit detectors 115(1) through 115(4) to reset and return them to zero voltage preparatory to receiving the next bits of information in the next bit bundle.

The leading edge of the pulse generated by digital to analog converter 10 and transmitted through line K(4) establishes the basic time point in the modulation and multiplexing cycle of the apparatus of the present invention from which all other functions of the circuit are timed.

With reference to FIGS. 1 and 5, upon receipt of the leading edge of the pulse from digital to analog converter 10, clock 20, at time T(2) generates a signal pulse on line K(5).

Time T(2) can be any point in time occuring before or coincident with time T(1). In the more complex embodiments of the present invention illustrated on the other Figures, the leading edge of the base time point pulse is arranged to be concurrent with the beginning of the bit bundle period.

As previously described, the leading edge of the clock pulse on line K(5) causes differentiating circuit 18 to generate a pulse as shown in curve D causing the tone signal of oscillator 17 to be released to amplifier 23.

The leading edge of the clock pulse on line K(5) also causes pulse generator 15 to generate the pulse shown in curve C and causes integrating circuit 14 to begin its ramp voltage output as shown in curve E.

The trailing edge of the clock signal pulse on line K(5) causes pulse generator switch 21 to open, that is, to prevent the tone from clock oscillator 22 from reaching amplifier 23. In the present embodiment, oscillator 22 is grounded or shorted out to prevent oscillation in the manner identical to the previously described circuits for oscillator 17 and switch 16.

With reference to FIG. 8, master clock 60 further functions to reset sample and hold circuits 59(1), 59(2), and 59(3) and gate the information sequentially to voltage and pulse generator circuit 11.

Upon receipt of the leading edge of the pulse from digital to analog converters 10(1), 10(2), and 10(3), master clock 60 generates three pulses in series.

During the time period T(1) to T(1.33), the first of the three pulses beginning at time T(1) and ending at time T(1.25) is generated on line K(5) for initiating the modulation function of circuit 11 and circuit 16 as previously described.

Also during the time period T(1) to T(1.33) a pulse beginning at time T(1) and ending at time T(1.33) is generated on line K(6) which is connected to one input side of FET amplifier switch 61(1) which gates the analog voltage on sample and hold circuit 59(1) to voltage comparator and pulse generator network 71 where it is modulated for time zone T(X).

During the time period T(1.33) to T(1.66), the second of the three pulses having a duration of 0.25 of the bit bundle period, beginning at time T(1.33) and ending at time T(1.58), is generated on line K(5) for initiating the modulation function of circuit 11 and circuit 16 as previously described.

Also during time period T(1.33) to T(1.66), a pulse beginning at time T(1.33) and ending at time T(1.66) is generated on line K(7) which is connected to one input side of FET amplifier switch 61(2) which gates the analog voltage in sample and hold circuit 59(2) to network 71 where it is modulated for time zone T(Y).

During the time period T(1.66) to T(2), the third of the three pulses having a duration of 0.25 of the bit bundle period, beginning at time T(1.66) and ending at time T(1.91) is generated on line K(5) for initiating the modulation function of circuit 11 and circuit 16 as previously described.

Also during time period T(1.66) to T(2), a pulse beginning at time T(1.66) and ending at time T(2) is generated on line K(8) which is connected to one input side of FET amplifier switch 61(3) which gates the analog voltage in sample and hold circuit 59(3) to network 71 where it is modulated for time zone T(Z).

Upon completion of the gating function, a signal is transmitted to sample and hold circuits 59(1), 59(2) and 59(3) from clock 60 on line K(9) to reset the circuits to zero.

With reference to FIG. 11, master clock 67 further functions to control parallel to series converter 66 by initiating cascade operation of gating circuits 86, 87, and 88.

Upon receipt of the leading edge of the pulse from digital to analog converters 10(1) through 10(6) on line K(4), master clock 67 initiates a pulse on line K(10) of a duration 0.25 of the bit bundle period beginning at time T(1) and ending at time T(1.25).

The signal on line K(10) is transmitted to parallel to series converter 66 gating circuit 86 of FIG. 16 and is arranged to have a rising voltage leading edge which causes an output pulse to be generated by gating circuit 86 initiating cascase operation of circuits 86, 87, and 88 as previously described for FIGS. 16, 17, and 18.

Referring to FIG. 16, the output sides 99Q, 100Q, and 101Q of gating circuits 86, 87, and 88 are connected to the input side of OR gate 108 whose output side is connected to line K(12) also connected to master clock 67.

Referring to FIG. 11, the circuit of master clock 67 is arranged so that the leading edge of the pulse of curve 99Q (FIG. 18) initiates a pulse on line K(11) and K(5) of a duration 0.25 of the bit bundle period from time T(1) to time T(1.25), the leading edge of the pulse of curve 100Q initiates a pulse on line K(11) and K(5) from time T(1.33) to T(1.58) and the leading edge of the pulse of curve 101Q initiates a pulse on line K(11) and K(5) from time T(1.66) to time T(1.91). These pulses on line K(11) initiate the modulation function of networks 11(1) and 11(2), and switches 16(1) and 16(2) as previously described during the periods of time zones T(X), T(Y), and T(Z).

The signal on line K(5), as previously described, gates the tone from clock oscillator 22 to amplifier 23 for tone multiplexing with the modulated signal on line 26.

With respect to the demodulation circuits, clock data recovery network 52 of FIG. 3, network 57 of FIG. 7, network 62 of FIG. 10 and network 70 of FIG. 13 all perform the following basic functions:

1. Detect and reconstruct the clock pulse signal generated by the clock of the modulation signal circuit.
2. Generate the timing pulse that initiates analog to digital conversion.

In FIG. 10, master clock data recovery network 62 further serially gates the analog information received from data recovery network 35 to sample and hold circuits 63(1), 63(2), and 63(3).

In FIG. 13, clock data recovery network 70 further initiates cascade operation of gating circuits 86', 87', and 88' of series to parallel converter 68 (FIG. 19).

With respect to FIG. 3, clock data recovery network 52 comprises identical circuit elements and operates in a manner identical to data recovery network 35 but with a fixed length timing pulse.

The leading edge of the reconstructed timing pulse initiates operation of integrating circuit 49 to produce the ramp voltage of curve U (FIG. 4).

The trailing edge of the reconstructed timing pulse initiates operation of analog to digital converter 50 where the analog signal is converted to its digital equivalent.

With respect to FIG. 7, master clock data recovery network 57 comprises identical circuit elements and operates in a manner identical to clock data recovery network 52 of FIG. 3.

With respect to FIG. 10, master clock data recovery network 62 functions in the identical manner as previously described, however, the signal pulses to FET amplifier switches 65(1), 65(2), and 65(3) are cycled to switch the analog signals to their respective channels.

As noted for the description of the operation of the modulation circuit of FIG. 8, and as can be seen from FIG. 9, a clock tone pulse is generated for each time zone beginning at time T(1), T(1.33), and T(1.66).

These same pulses are demodulated and reconstructed by master clock data recovery network 62 (FIG. 10) and transmitted on line K(4) to integrating circuit 49 where the trailing edge of the pulse resets integrator 49 to zero preparatory to integration of the next serially received pulse signal, at times T(1) to T(1.33), T(1.33) to T(1.66), and T(1.66) to T(2).

Concurrently, network 62 also generates a signal pulse on line K(15) from time T(1) to T(1.33), line K(16) from time T(1.33) to T(1.66), and line K(17) from time T(1.66) to T(2), which are connected, respectively, to FET amplifier switches 65(1), 65(2), and 65(3) to sequentially gate the analog information during time zones T(X′), T(Y′), and T(Z′), respectively, to sample and hold circuits 63(1), 63(2), and 63(3), respectively.

Immediately after the analog voltage is gated to sample and hold circuits 63(3) for time zone T(Z), a signal is transmitted on line K(18) to analog to digital converters 50(1), 50(2), and 50(3), to initiate conversion of the analog voltage to its corresponding digital equivalent.

With respect to FIG. 13, clock data recovery network 70 functions in the identical manner as the previously described networks.

It will be noted from FIG. 12 that one clock tone signal is generated which occurs during time zone T(X′). the demodulated and reconstructed clock signal for time zone T(X′) is used to initiate a series of three timing pulses for the three time zones T(X′), T(Y′) and T(Z′) which are transmitted on line K(19) of FIG. 13 to integrating circuit 49(1) and 49(2) where the leading edge of each clock pulse begins the integration period.

The clock signal from network 70 to initiate operation of series to parallel converter 68 is transmitted over line K(20) and can be of two kinds.

For the circuit of FIG. 19 previously described using cascade operation of gating circuits 86′, 87′ and 88′, a single signal pulse having its leading edge beginning at time T(1), the beginning of time zone T(X′), is applied to the input side 95′ of gating circuit 86′.

As previously described, gating circuits 86′, 87′ and 88′ cascade in their operation to gate the serially received analog signals to the respective parallel arranged sample and hold circuits 104(1) through 104(6).

For an alternative method of operation, as shown in FIG. 19A, three line K(20), K(21), and K(22) are connected respectively, to the input sides 95′, 96′ and 97′ of gating circuits 86′, 87′, and 88′ whose output sides 99′Q′ and 100′Q′ are left unconnected.

The clock pulse for time zone T(X′) is transmitted to gating circuit 86′ over line K(20), the clock pulse for time zone T(Y′) is transmitted to gating circuit 87′ over line K(21), while the clock pulse for time zone T(Z′) is transmitted to gating circuit 88′ over line K(22).

The operation of series to parallel converter 68 otherwise remains unchanged.

Immediately after sample and hold circuit 104(1) through 104(6) are filled, a pulse or signal from clock network 70 is transmitted over line K(23) to sequential scanner and pulse generator 126 of analog to digital converters 50(1) through 50(6), respectively, which initiates conversion of the analog voltage to its digital equivalent on their respective channel outputs.

Digital to Analog Converter

With reference to FIG. 21, digital to analog converter 10 comprises an input signal register 114 having four output lines L(1) through L(4) connected, respectively, to first 1 bit detector 115(1), second 1 bit detector 115(2), third 1 bit detector 115(3), and fourth 1 bit detector 115(4), with clock signal line K(3) connected to digital to analog control clock 121.

For the embodiment previously described, a four bit bundle is used. If an eight bit bundle were to be used, input signal register 114 would have eight output lines and a clock line.

Input signal register 114 can be any well known circuit whereby the first bit of information is stored on line L(1), the second serially received bit is stored on line L(2), the third serially received bit is stored on line L(3), and the fourth serially received bit stored on line L(4), with a signal transmitted on line K(4) immediately upon receipt of the fourth bit. A signal from analog control clock 121 can then reset register 114 to zero or the fifth bit that is received can replace the prior bit on line L(1) to begin a new four-bit series.

Digital to analog converter 10 further comprises FET amplifier switches 117(1) through 117(4) having one input side connected, respectively, through lines M(1) through M(4) to bit detectors 115(1) through 115(4).

Converter 10 further comprises a reference voltage source 116 which is connected to series connected resistors R-91 through R-94 which are connected respectively, to FET amplifier switches 117(1) through 117(4).

The output side of FET amplifier switches 117(1) through 117(4) are connected, respectively, through lines N(1) through N(4) to voltage summing and hold circuit 120.

Digital to analog control clock 121 is connected to register 114, bit detectors 115(1)-115(4) and voltage summing and hold circuit 120 by lines K(3), K(2), and K(1), respectively.

As for the operation of digital to analog converter 10, the digital input signal of serially transmitted 1 and 0 bits enters input signal register 114 where it is separated into 1st, 2nd, 3rd, and 4th bits appearing as voltages on lines L(1), L(2), L(3), and L(4), respectively. The voltage on lines L(1) through L(4) will be either positive, for a 1 bit, or negative, for a 0 bit.

The 1 bit detectors 115(1) through 115(4) are arranged to produce an output voltage on lines M(1) through M(4) when the bit information on its input is a positive or 1 bit, and no output voltage when the bit information is a negative or 0 bit.

Resistances R-91 through R-94 are arranged to produce, in cooperation with reference voltage source 116, voltage ratios of 1, 2, 4, and 8 on the respective input sides of FET amplifier switches 117(1), 117(2), 117(3), and 117(4). The other input side of FET amplifier switches 117(1) through 117(4) are connected, respectively, to lines M(1) through M(4) from bit detectors 115(1) through 115(4).

The four outputs from FET amplifier switches 117(1) through 117(4) appear on lines N(1) through N(4), respectively, and, when activated, are of 1 volt, 2 volts, 4 volts, and 8 volts magnitude, respectively.

Voltage summing and hold circuit 120 adds the voltages appearing on lines N(1) through N(4) to produce the analog voltage output. Thus the analog output is the sum of any combination of the four voltages 1, 2, 4 or 8 volts appearing, respectively, on lines N(1), N(2), N(3), or N(4).

For example, an input digital signal "1101" would result in a positive voltage on lines L(1), L(2), and L(4), and a negative voltage on line L(3).

The output from the 1 bit detectors would produce a voltage on lines M(1), M(2), and M(4) and no voltage on line M(3).

The voltage on lines M(1), M(2), and M(4) would cause FET amplifier switches 117(1), 117(2), 117(3), and 117(4) to conduct and a voltage of 1 volt to appear on line N(1), 2 volts to appear on line N(2), and 8 volts to appear on line N(4), all of which when added together by voltage summing circuit 120 produces an analog output voltage of 11 volts.

Digital to analog control clock 121 uses line K(1) to release the analog output and reset voltage summing circuit 120 to zero, uses line K(2) to reset 1 bit detectors 115(1) through 115(4) to zero, and uses line K(3) to detect the four bit sequence of the input signal and reset the input signal register to zero.

Table 23 illustrates the analog voltage for the six channels of digital information graphically illustrated in FIG. 12 and tabulated in Table 4.

TABLE 23

| Channel | Bit Bundle | Signal Time Period | Analog Voltage |
|---|---|---|---|
| 1 | 1101 | T(0)–T(1) | 11 volts |
| 1 | 0011 | T(1)–T(2) | 12 |
| 1 | 1010 | T(2)–T(3) | 5 |
| 2 | 0011 | T(0)–T(1) | 12 |
| 2 | 0110 | T(1)–T(2) | 6 |
| 2 | 0010 | T(2)–T(3) | 4 |
| 3 | 1000 | T(0)–T(1) | 1 |
| 3 | 1101 | T(1)–T(2) | 11 |
| 3 | 1001 | T(2)–T(3) | 9 |
| 4 | 1001 | T(0)–T(1) | 9 |
| 4 | 1011 | T(1)–T(2) | 13 |
| 4 | 0001 | T(2)–T(3) | 8 |
| 5 | 0100 | T(0)–T(1) | 2 |
| 5 | 0110 | T(1)–T(2) | 6 |
| 5 | 1100 | T(2)–T(3) | 3 |
| 6 | 0101 | T(0)–T(1) | 10 |
| 6 | 1100 | T(1)–T(2) | 3 |
| 6 | 1011 | T(2)–T(3) | 13 |

Where:
1st "1" bit generates 1 volt
2nd "1" bit generates 2 volts
3rd "1" bit generates 4 volts
4th "1" bit generates 8 volts Analog to Digital Converter With reference to FIG. 22, analog to digital converter 50 comprises a digital cycling circuit 123 having four output lines A(1) through A(4), connected, respectively, to one input side of FET amplifier switches 124(1) through 124(4), an error detector line E(1) connected to error signal detector 125 and sequential scanner and pulse generator 126, and a scan signal line J(1) connected to sequential scanner and pulse generator 126.

Converter 50 further comprises a voltage source 127 which is connected to series connected resistors R-100, R-101, R-102, and R-103, which are connected, respectively, to the other input side of FET amplifier switches 124(1) through 124(4).

The output side of FET amplifier switches 124(1) through 124(4) are connected, respectively, through lines B(1)–B(4) to voltage summing ciruit 129.

The output of voltage summing circuit 129 is connected to one input side of voltage comparator 130 whose other input side is connected to receive the input analog signal. The output side of voltage comparator 130 is connected to error signal detector 125.

As for the operation of analog to digital converter 50, digital cycling circuit 123 applies concurrent voltages in various permutations and combinations on lines A(1) through A(4) covering all 16 possible combinations for each cycle.

After the start conversion signal is received from clock network 70 on line K(23) (FIG. 13), that signal forces the digital cycling circuit 123 to zero. The gated cycle clock is free running with a cycle period less than the modulated pulse period, and gated on with the receipt of the start conversion signal on line K(23) and gated off with the end of conversion signal applied to the reset.

Resistances R-100 through R-103 are arranged to produce an output voltage, in cooperation with reference voltage source 127, having ratios of 1, 2, 4, and 8 on the respective input sides of FET amplifier switches 124(1) through 124(4).

Voltages on lines A(1) through A(4) will cause FET amplifier switches 124(1) through 124(4) to conduct and cause voltage ratios of 1, 2, 4, and 8, respectively, to appear on lines B(1), B(2), B(3), and B(4) which are summed by voltage summing circuit 129 to provide the sum voltage on line F(1).

These summed voltages, since they are artificial representations of the analog voltages received, will be referred to as pseudoanalogous voltages.

The summed voltage, pseudoanalogous voltage, is compared with the input analog voltage by voltage comparator 130. If the voltages are not equal, the error signal detector permits the digital cycling circuit to continue with its sequence. At some point in the cycle, the pseudoanalogous voltage on line F(1) and the input voltage will be equal or within a given error percentage, at which point the error signal detector, by means of line E(1), signals the digital cycling circuit to stop cycling.

As will be described below, upon receiving the stop signal from circuit 123, sequential scanner and pulse generator 126 then sequentially scans lines H(1) through H(4) for active lines. Where the line is active, that is, where a voltage appears on the line, the pulse generator section of the circuit produces a 1 bit or positive voltage pulse output. Where the line is not active, that is, no voltage appears on the line, the pulse generator section of the circuit produces a 0 bit or negative voltage pulse output.

After scanning, a signal on line J(1) starts the cycling period of digital cycling circuit 123 again for the next input analog signal.

Sequential Scanner and Pulse Generator

Figure 23:
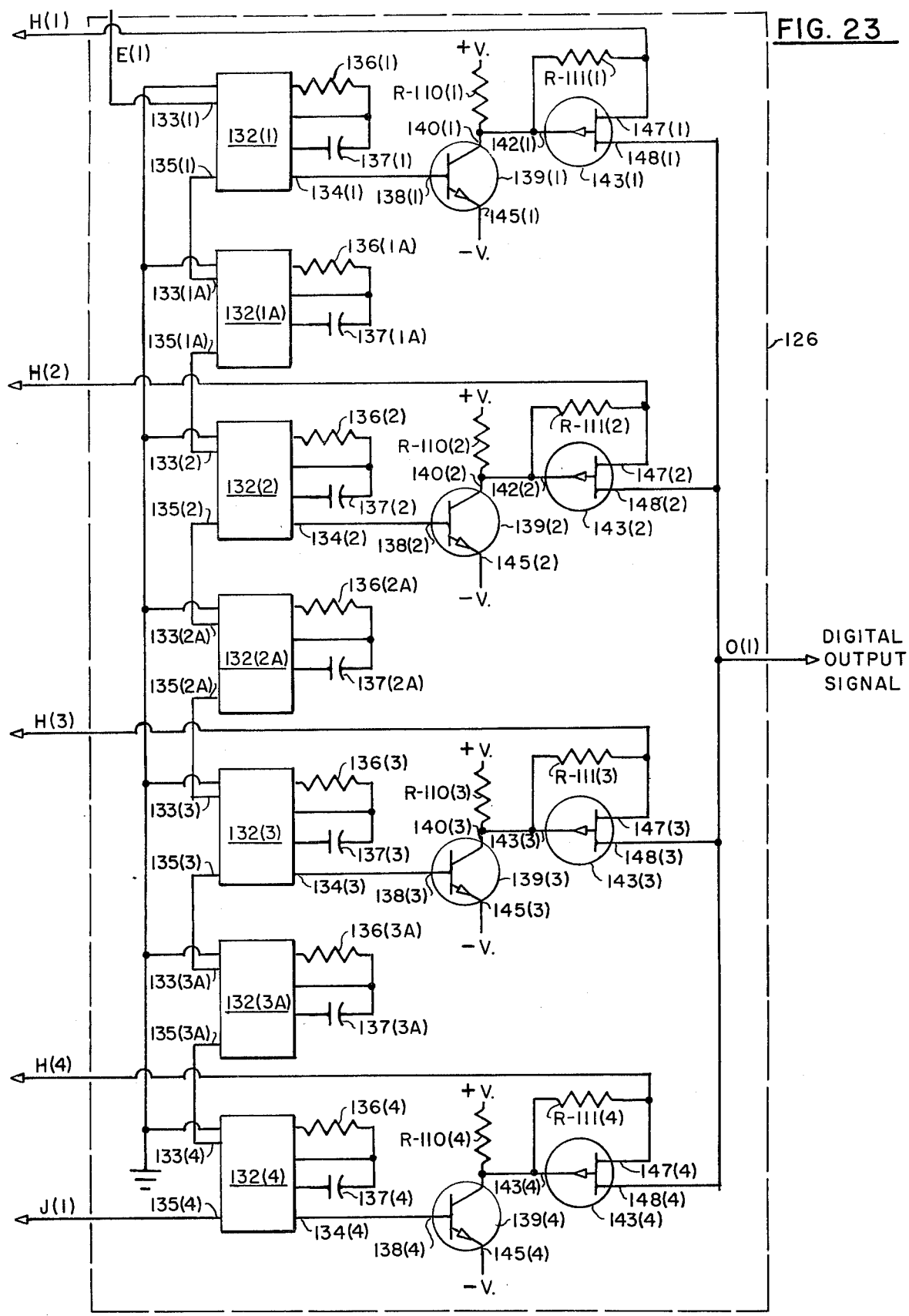
FIG. 23 is a circuit diagram of the sequential scanner and pulse generator of FIG. 22.

With reference to FIG. 23, the sequential scanner and pulse generator 126 of FIG. 22 is shown in greater detail and comprises gating circuits 132(1), 132(1A), 132(2), 132(2A), 132(3), 132(3A), and 132(4) collectively referred to as gating circuits 132. When referring collectively to the other circuit elements of circuit 126, the numbers in parentheses will not be used in order to simplify the description it being understood that the numbers in parentheses are used to distinguish specific circuit elements which are identical.

Each gating circuit 132 comprises a signal input side 133, a positive pulse output side 134 and a negative pulse output side 135 along with connections for a timing resistor 136 and timing capacitor 137.

With respect to gating circuits 132(1), 132(2), 132(3) and 132(4), the positive pulse output side 134 is connected to base 138 of transistor 139 whose collector 140 is connected to gate 142 of field effect transistor 143. Emitter 145 of transistor 139 is connected to the negative voltage side of a power supply, (not shown), common in the art, which establishes the pulse height of the 0 bit output pulse, while collector 140 of transistor 139 is connected to the positive voltage side of a power supply (not shown) common in the art, through resistor R-110, which establishes the pulse height of the 1 bit output pulse.

The source side 147 of field effect transistor 143 is connected to a line H which is connected to a corresponding line A (FIG. 22) for detecting which of the lines A(1)–A(4) is active, (is raised to a particular voltage) or inactive, (is at zero voltage).

Resistor R-111 is connected between gate 142 and source 147 of field effect transistor 143 to cause it to conduct when a positive voltage appears on line H.

The drain side 148 of field effect transistor 143 is connected in common with the drains 148 of the other field effect transistors 143 which terminate in line 0(1) from which the digital output signal is obtained.

To create a sequential series of output pulses, the negative pulse output sides 135 of gating circuits 132 are connected serially to the input signal side 133 of the next gating circuit.

In FIG. 23, negative pulse output side 135(1) of gating circuit 132(1) is connected to signal input side 133(1A) of gating circuit 132(1A). The negative pulse output side 135(1A) of gating circuit 132(1A) is connected to signal input side 133(2) of gating circuit 132(2), and so on, the remaining gating circuits are connected with their negative pulse output sides connected to the signal input side of the next gating circuit.

Figure 24:
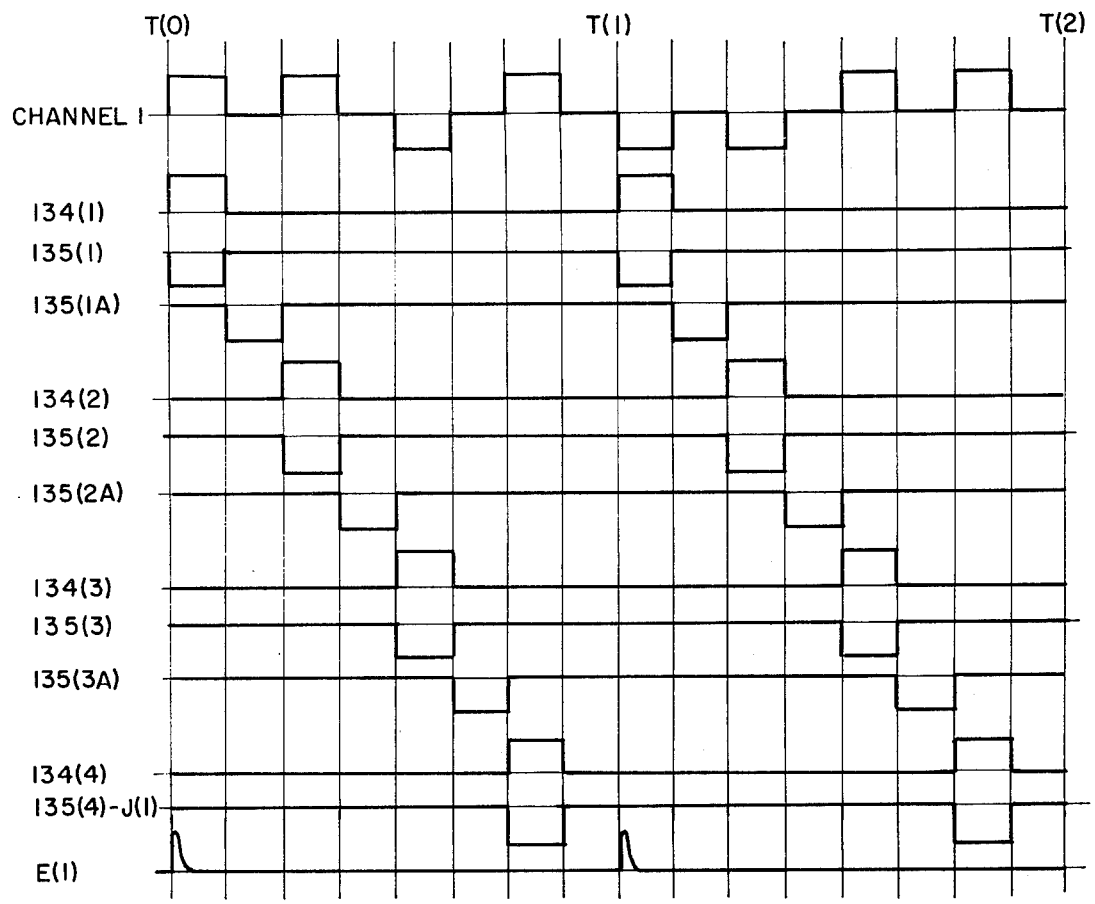
FIG. 24 is a series of graphs of wave shapes of the input and output signals for the gating circuits and connection lines of FIG. 23.

The time period or length of the pulse generated by gating circuits 132 are graphically illustrated in FIG. 24 in which the output signal from channel 1 (corresponding to the input signal) and the output signals for gating circuits 132(1) through 132(4) are shown for the time period T(0)–T(2).

The digital signal illustrated for channel 1 is the same bit combination or bit bundle as illustrated previously in FIGS. 9 and 12, namely, bit bundle combination 1101 for time period T(0)–T(1) and bit bundle combination 0011 for time period T(1)–T(2).

With reference to FIGS. 22 and 23, Table 24 designates the active line corresponding to the bit bundle combination.

TABLE 24

| Bit Bundle | Signal Time Period | Active Lines |
|---|---|---|
| 1101 | T(0)–T(1) | A(1),A(2),A(4)....H(1),H(2),H(4) |
| 0011 | T(1)–T(2) | A(3),A(4).........H(3),H(4) |

As previously described, when error signal detector 125 detects matching voltages from voltage comparator 130, a signal is generated on line E(1).

In FIG. 23, line E(1) is connected to the signal input side 133(1) of gating circuit 132(1) and is of a polarity as shown in FIG. 24, where the leading edge of the pulse initiates operation of gating circuit 132(1) to begin the chain, sequential or cascade operation of gating circuits 132.

The length of pulse generated by gating circuits 132 is established by the value of timing resistor 136 and timing capacitor 137 as previously described for gating circuits 86, 87, and 88 of FIGS. 16, 17 and 18.

The pulse length, in the present example (FIG. 24), is established to be one-eighth of the time period T(0)–T(1) which is the bit bundle period.

Referring to both FIGS. 23 and 24, the leading edge of the signal on line E(1) initiates a positive pulse on output side 134(1) and simultaneously initiates a negative pulse on output side 135(1) of gating circuit 132(1), which occurs during the first one-eighth of the time period T(0)–T(1).

The trailing edge of the pulse on output side 135(1), which is connected to input side 133(1A) of gating circuit 132(1A) initiates a negative pulse on output side 135(1A) of gating circuit 132(1A) which occurs during the second one-eighth of the time period T(0)–T(1).

The trailing edge of the pulse on output side 135(1A), which is connected to the input side 133(2) of gating circuit 132(2) initiates a positive pulse on output side 134(2) and simultaneously initiates a negative pulse on output side 135(2) of gating circuit 132(2) which occurs during the third one-eighth of time period T(0)–T(1).

In a similar manner for gating circuits 132(2A), 132(3), 132(3A), and 132(4), output pulses are produced for the fourth, fifth, sixth and seventh one-eighth portions, respectively, of the time period T(0)–T(1).

During the seventh one-eighth of the time period T(0)–T(1), a negative pulse is generated on line J(1) which signals digital cycling circuit 123 that sequential scanning is completed and cycling may begin.

It can be seen from Table 24, that for the time period T(0)–T(1), for the bit combination shown, lines H(1), H(2), and H(4) are active, that is, are raised to a particular voltage.

As previously described, upon receipt of the signal on line E(1), gating circuit 132(1) is caused to produce an output pulse on output side 134(1) which is connected to base 138(1) of transistor 139(1).

Since a particular voltage appears on line H(1), a voltage drop will occur across resistor R-111 connected between source 147(1) and gate 142(1) of field effect transistor 143(1) causing drain 148(1) to see a positive voltage pulse which appears on line 0(1) for the duration of the pulse output of gating circuit 132(1). In other words, a 1 bit pulse appears on line 0(1) during the first one-eighth of the time period T(0)–T(1).

The second one-eighth of the time period T(0)–T(1) is taken by the pulse operation of gating circuit 132(1A).

In a like manner as for gating circuit 132(1), since line H(2) is also active, a positive pulse will appear at drain 148(2) and line 0(1) during the third one-eighth of the time period T(0)–T(1).

However, for gating circuit 132(3), since line H(3) is not active, and there is no voltage drop across resistor R-111(3), a negative pulse, as previously described, will appear at drain 148(3) and line 0(1) during the fifth one-eighth of the time period T(0)–T(1).

Finally, in a like manner as for gating circuits 132(1) and 132(2), since line H(4) is active, a positive voltage pulse appears at drain 148(4) and line 0(1) during the seventh one-eighth of the time period T(0)–T(1).

In a similar manner, the positive and negative pulses representing the bit bundle combination 0011 will appear on line 0(1) during the time period T(1)–T(2).

Voltage Summing Circuit

Figure 25:
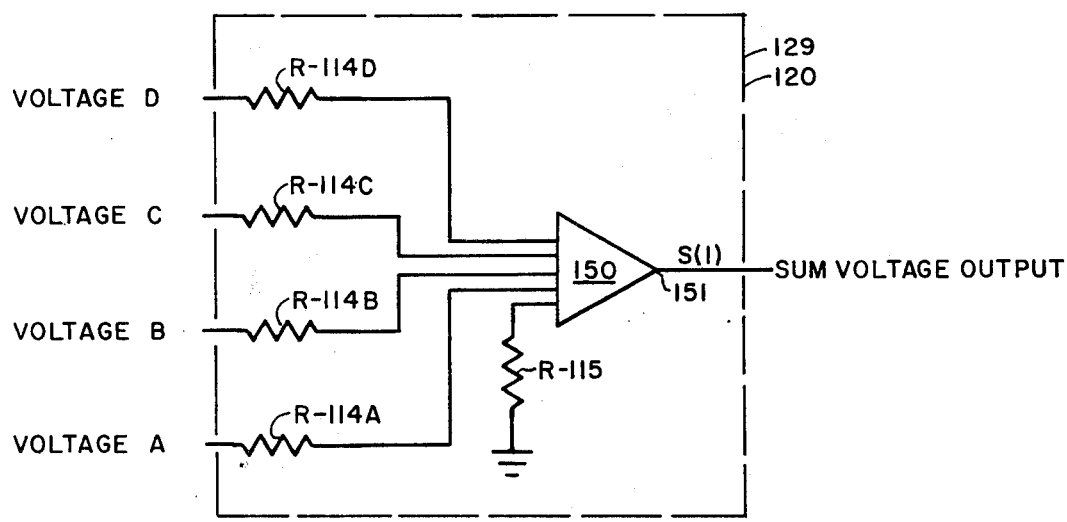
FIG. 25 is a circuit diagram of a typical voltage summing circuit.

The voltage summing circuit 120 shown in FIG. 21 and circuit 129 shown in FIG. 22 is shown in detail in FIG. 25 and comprises input resistor R-114A through R-114D, which are connected to individual input sides of summing amplifier 150.

Amplifier 150 is a standard amplifier common in the art which adds voltages A through D appearing at input resistors R-114A through R-114D to produce the sum voltage on line S(1) at the output side 151 of amplifier 150.

To achieve a different sum voltage for each combination of input voltages A through D, the input voltages should have valves at least in geometric progression, for example, voltage A = 1 volts, voltage B = 2 volts, voltage C = 4 volts and voltage D = 8 volts. Table 25 lists all combinations of voltages and their sum.

TABLE 25

| Voltage Combination | Sum Voltage |
|---|---|
| A | 1 |
| B | 2 |
| A + B | 3 |
| C | 4 |
| A + C | 5 |
| B + C | 6 |
| A + B + C | 7 |
| D | 8 |
| A + D | 9 |
| B + D | 10 |
| A + B + D | 11 |
| C + D | 12 |
| A + C + D | 13 |
| B + C + D | 14 |
| A + B + C + D | 15 |

It can be seen that if voltage A = 2 volts, voltage B = 4 volts, voltage C = 8 volts and voltage D = 16 volts, the voltage difference between steps would be 2 volts with fifteen steps beginning at 2 volts and ending at 30 volts.

The typical values for circuit elements of voltage summing circuit 120 (129) of FIG. 25 are given in Table 26.

TABLE 26

| Voltage Summing Circuit 120 (129) | |
|---|---|
| Circuit Element | Value or Identification |
| Amplifier 150 | LM301 |
| R-114A | 150 K |
| R-114B | 150 K |
| R-114C | 150 K |
| R-114D | 150 K |

Digital Cycling Circuit

Figure 26:
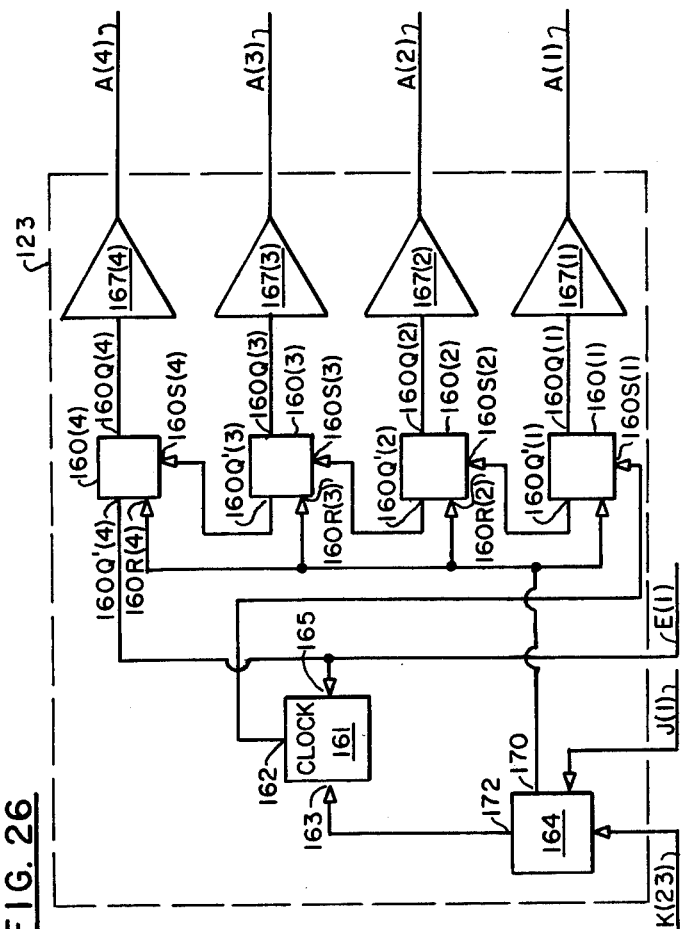
FIG. 26 is a circuit diagram of a typical digital cycling circuit.

Digital cycling circuit 123 of FIG. 22 is shown in greater detail in FIG. 26 and comprises four binary bi-stable flip-flop circuits 160(1), 160(2), 160(3), and 160(4) connected in cascade to operate as a four digit binary adder, and a multivibrator clock 161 whose output side 162 is connected to input or signal side 160(1) of the first flip-flop circuit 160(1), and whose start side 163 is connected to output side 172 of reset-start circuit 164. The stop side 165 of clock 161 is connected in common to line E(1) and Q' output side 160Q'(4) of flip-flop circuit 160(4).

Each flip-flop circuit 160(1), 160(2), 160(3), and 160(4) is connected with its Q output side, respectively, to the input side of amplifier 167(1), 167(2), 167(3), and 167(4), whose outputs appear, respectively, on lines A(1), A(2), A(3), and A(4).

The reciprocal or Q' output side 160Q'(1), 160Q'(2), and 160Q'(3) of flip-flop circuits 160(1), 160(2), and 160(3) are, respectively, connected to the input side 160S(2), 160S(3), and 160S(4), respectively, of flip-flop circuits 160(2), 160(3), and 160(4).

The R or reset side 160R(1), 160R(2), 160R(3), and 160R(4) of flip-flop circuits 160(1), 160(2), 160(3), and 160(4), respectively, are all connected in common to output side 170 of start-reset circuit 164.

Figure 27:
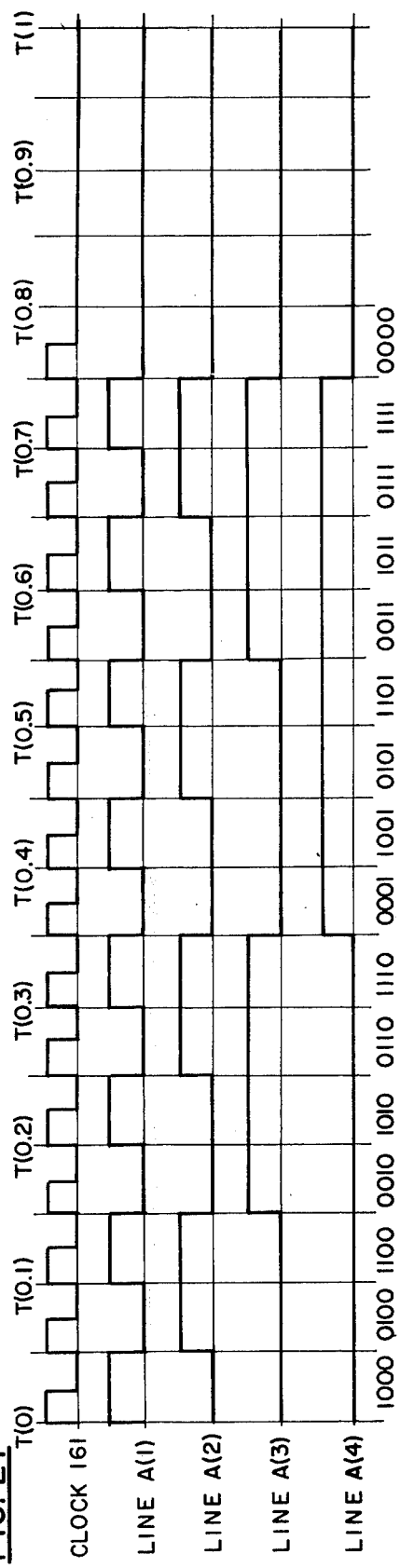
FIG. 27 is a series of graphs of wave shapes of the voltages generated by the digital cycling circuit of FIG. 26.

Clock 161, in particular, is a multivibrator circuit common in the art, having a pulse output as shown in FIG. 27 for curve clock 161. The leading edge of a pulse received at start side 163 of clock 161, causes clock 161 to begin generating its train of pulses shown in FIG. 27.

Reset-start circuit 164 is a one-shot pulse generator, common in the art, which generates a short output pulse on output sides 170 and 172 upon receipt of the leading edge of a pulse either on line K(23) or J(1). The short pulse on output side 170 is received simultaneously at reset sides 160R(1), 160R(2), 160R(3), and 160R(4), respectively, of flip-flop circuits 160(1), 160(2), 160(3), and 160(4) to reset Q output sides 160Q(1), 160Q(2), 160Q(3), and 160Q(4), respectively, to zero. At the same time, the short pulse on reset-start circuit 164 output side 172 is received at start side 163 of clock 161 to initiate operation of clock 161 at time T(0) (FIG. 27).

With reference to FIG. 27, the output voltage curves for clock 161 and lines A(1), A(2), A(3), and A(4) are shown for the typical time period T(0) to T(1), which is the same as the bit bundle period. During this time period, digital cycling circuit 123 must generate all the permutations and combinations of voltages possible on lines A(1), A(2), A(3), and A(4), which, for the four digit example used throughout this description, comes to sixteen possible combinations. If an eight digit binary code were used, there would be 64 possible combinations.

For the present example, time period T(0) to T(1) has been divided into 20 time intervals, 16 of which are used for the four digit binary code permutations and combinations leaving four-twentieths of the time period (four-twentieths of the bit bundle period) available for circuit or switching delays or other functions as may be desired. The time period T(0) to T(1) could be divided into sixteen time periods without any extra time period for the present four bit bundle example just as easily as 20 time periods.

With respect to operation of digital cycling circuit 123, at time T(0) upon receipt of the leading edge of a pulse on either line K(23) or J(1), reset-start circuit 164 is caused to generate a short pulse on output sides 170 and 172.

As previously described, the leading edge of the pulse on output side 170 is received simultaneously at reset sides 160R(1), 160R(2), 160R(3), and 160R(4) of flip-flop circuits 160(1), 160(2), 160(3), and 160(4), respectively, to reset sides 160Q(1), 160Q(2), 160Q(3), and 160Q(4), respectively, to zero voltage.

The leading edge of the pulse on reset-start cicruit 164 output side 172 is received at clock 161 input side 163 which initiates operation of clock 161 to generate its first pulse beginning at time T(0). Although there is actually a short time delay between the leading edge of the pulse on line K(23) or J(1) and the leading edge of the first clock 161 output pulse, for all practical purposes, the time delay is short compared with the time period T(0) to T(0.05), so that it will, for the present example, be considered negligible.

The leading edge of the first output pulse generated by clock 161 at time T(0) is received at input side 169(1) of bi-stable flip-flop circuit 160(1) causing circuit 160(1) to change its state of balance and a voltage to appear at output side 160Q(1), which is amplified by amplifier 167(1) and appears as a voltage on line A(1) beginning at time T(0).

The leading edge of the second output pulse generated by clock 161 at time T(0.05) is received at input side 160S(1) of flip-flop circuit 160(1) causing circuit 160(1) to change its state of balance with the voltage on Q output side 160Q(1) going to zero and a voltage to appear on Q' output side 160Q'(1). The leading edge of the rising voltage on output side 160Q'(1) is received at input side 160S(2) of flip-flop circuit 160(2) causing circuit 160(2) to change its state of balance and a voltage to appear at Q output side 160Q(2), which is amplified by amplifier 167(2) and appears as a voltage on line A(2) beginning at time T(0.05).

In a like manner, the leading edge of the pulses generated by clock 161 cause flip-flop circuit 160(1) to alternately change its state of balance and, in turn, change the state of balance of flip-flop circuits 160(2), 160(3), and 160(4) to cause various permutations amd combinations of voltages to appear on lines A(1), A(2), A(3), and A(4) as shown by the voltage curves of FIG. 27.

At time T(0.75), when flip-flop circuit 160(4) changes its state of balance by Q output side 160Q(4) returning to zero voltage, the output voltage appearing on Q' output side 160Q'(4) of circuit 160(4) is the signal that causes clock 161 to stop, if clock 161 was not stopped earlier by a voltage pulse on line E(1).

Normally, a voltage pulse will be received on line E(1) at some time during the cycle to indicate a matching of the received signal voltage and the pseudoanalogous voltage generated by voltage summing circuit 129 (FIG. 22).

Upon receipt of such a pulse, for example, upon matching of the analog voltage corresponding to bit bundle 1101 during the time period T(0)–T(1), clock 161 will stop immediately after time T(0.5) and before T(0.55), at which time, lines A(1), A(2), and A(4) would be active, that is, a voltage would appear on lines A(1), A(2), and A(4).

Table 27 is a tabulation of bit bundle, pseudoanalogous voltage, and active line for the typical bit bundle period T(0)–T(1).

TABLE 27

| Time Period | Bit Bundle | Pseudoanalogous Voltage | A(1) | A(2) | A(3) | A(4) |
|---|---|---|---|---|---|---|
| T(0)–T(0.05) | 1000 | 1 | X | | | |
| T(0.05)–T(0.10) | 0100 | 2 | | X | | |
| T(0.10)–T(0.15) | 1100 | 3 | X | X | | |
| T(0.15)–T(0.20) | 0010 | 4 | | | X | |
| T(0.20)–T(0.25) | 1010 | 5 | X | | X | |
| T(0.25)–T(0.30) | 0110 | 6 | | X | X | |
| T(0.30)–T(0.35) | 1110 | 7 | X | X | X | |
| T(0.35)–T(0.40) | 0001 | 8 | | | | X |
| T(0.40)–T(0.45) | 1001 | 9 | X | | | X |
| T(0.45)–T(0.50) | 0101 | 10 | | X | | X |
| T(0.50)–T(0.55) | 1101 | 11 | X | X | | X |
| T(0.55)–T(0.60) | 0011 | 12 | | | X | X |
| T(0.60)–T(0.65) | 1011 | 13 | X | | X | X |
| T(0.65)–T(0.70) | 0111 | 14 | | X | X | X |
| T(0.70)–T(0.75) | 1111 | 15 | X | X | X | X |
| T(0.75)–T(0.80) | 0000 | 0 | | | | |
| T(0.80)–T(1) | — | — | — | — | — | — |

In the above example, upon the start of each new cycle, all flip-flop circuits 160 are reset to zero. Under certain circumstances this function is not necessary. Since the binary adder combination of flip-flop circuits 160(1), 160(2), 160(3), and 160(4) repeats itself automatically every sixteen pulses from clock 161, clock 161 can be left free running and be stopped only by a signal on line E(1) when a matching information carrying signal is received, and started again, or released to return to the free running condition, upon receipt of a signal on line J(1) indicating that sequential scanner and pulse generator 126 has completed its scan of lines A(1) through A(4), as previously described.

For example, the digital information carried on channel 1 (FIGS. 6, 9, and 12) comprises the serially transmitted and received signal corresponding to bit bundles 1101, 0011, and 1010.

When the analog voltage corresponding to bit bundle 1101 is detected by error signal detector 125 (FIG. 22) the resulting signal on line E(1) will stop clock 161 at time T(0.5) at which time sequential scanner and pulse generator 126 proceeds with its sequential scanning operation and detects voltages on lines A(1), A(2), and A(4). After the scan is completed, a signal on line J(1) will cause clock 161 to begin generating pulses to continue the cycling process such that the next pulse causes the binary adder combination of flip-flop circuits 160(1), 160(2), 160(3), and 160(4) tp generate the combination of voltages that would occur during the time period T(0.55)–T(0.60) which corresponds to bit bundle 0011, which also happens to be the next bit bundle in the serially transmitted signal on channel 1. The analog voltage corresponding to bit bundle 0011 is detected by error signal detector 125 causing clock 161 to stop after generating one pulse, at which time sequential scanner and pulse generator 126 again performs its scanning function as previously described.

Again, upon receiving the signal on line J(1), clock 161 will begin generating pulses causing the binary adder combination of flip-flop circuits 160(1), 160(2), 160(3), and 160(4) to generate voltage combinations on lines A(1), A(2), A(3), and A(4) serially in time corresponding to time periods T(0.65)–T(0.7), T(0.7)–T(0.75), T(0.75)–T(0.8), T(0)–T(0.05), T(0.05)–T(0.1), etc., until time period T(0.2)–T(0.25) is reached which corresponds to bit bundle 1010, at which tme the third bit bundle 1010 is detected by error signal detector 125, clock 161 is stopped, and lines A(1) through A(4) are scanned by sequential scanner and plulse generator 126, as previously described.

FET Amplifier Switch

Figure 28:
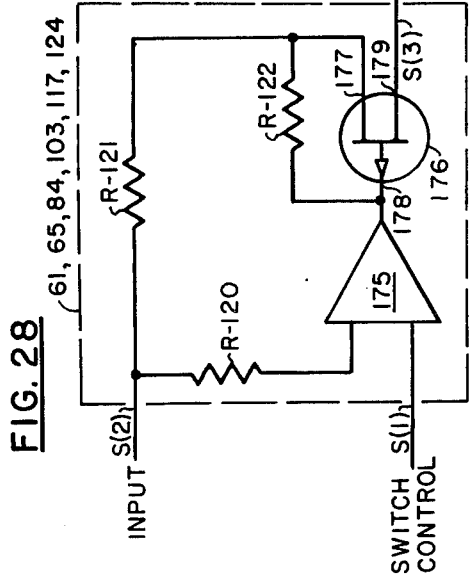
FIG. 28 is a circuit diagram of a typical FET amplifier switch.

With reference to FIG. 28, there is illustrated a circuit diagram for the typical FET amplifier switch previously referred to as switches 61 (FIG. 8), 65 (FIG. 10), 84 (FIG. 16), 103 (FIG. 19), 117 (FIG. 21), and 124 (FIG. 22).

The purpose of the FET amplifier switch is to control the flow of an electrical current to achieve zero voltage drop across the switch when it is conducting.

The FET amplifier switch of FIG. 28 comprises a high impedance input operational amplifier 175, such as an FET input amplifier, whose output is connected to the gate side 178 of FET transistor 176 with one of its two input sides connected to switch control line S(1) and the other of its input sides connected to input signal line S(2) through isolation resistance R-120.

Input signal line S(2) is also connected, through isolation resistance R-121, to the source side 177 of FET transistor 176. Resistor R-122 is connected across the gate and source sides of FET transistor 176. The drain side 179 of FET transistor 176 is connected to line S(3) which constitutes the switched output side of the FET amplifier switch circuit of FIG. 28.

The typical values for the circuit elements of the typical FET amplifier switch circuit of FIG. 28 are given in Table 28.

TABLE 28

| FET Amplifier Switches 61, 65, 84, 103, 117, and 124 | |
|---|---|
| Circuit Element | Value or Identification |
| Amplifier 175 | SU536 |
| FET Transistor 176 | UC420 |
| R-120 | 10 Meg. |
| R-121 | 1 K |
| R-122 | 40–50 K |

As for the operation of the FET amplifier switch of FIG. 28, it can be seen that upon receiving a signal on switch control line S(1), the received signal is amplified by amplifier 175 whose amplified output causes FET transistor 176 to conduct. The voltage on line S(2) is thus switched onto line S(3) with the voltage drop through the circuit fully compensated for.

I claim:

1. A communication system comprising
    means for converting an input information carrying signal having a predetermined number of units of information occurring in a first predetermined time period into an oscillating sinusoidal wave pulse occurring during a second predetermined time period after said first time period, said second time period beginning after the end of said first time period, said oscillating sinusoidal wave pulse having a particular time duration corresponding to the particular combination of said predetermined number of units of information occurring in said first time period, the maximum time duration of said second time period being shorter than said first time period, and
    means for converting said oscillating sinusoidal wave pulse back into a signal operably identical to said input information carrying signal operably connected to said means for converting an input information carrying signal into an oscillating sinusoidal wave pulse.

2. The apparatus as claimed in claim 1 wherein said means for converting an input information carrying signal into an oscillating sinusoidal wave pulse comprises
    means for distinguishing said units of information occurring in a first predetermined time period into separately identifiable bundles of information,
    means for converting each of said bundles of information into an oscillating sinusoidal wave pulse occurring during a second time period, said second time period beginning after the end of said first time period, said oscillating sinusoidal wave pulse having a time duration corresponding to the identity of its corresponding bundle of information, the maximum time duration of said second time period being shorter than said first predetermined time period of said bundle of information.

3. The apparatus as claimed in claim 2 wherein said means for distinguishing said units of information occurring in a first time period into separately identifiable bundles of information and for converting each of said bundles into an oscillating sinusoidal wave pulse comprises
    means for converting each of said bundles of information into an analog voltage at the end of said first time period, the value of which is analogous to said separately identifiable bundles of information, and
    means for converting said voltage representative of said separately identifiable bundles of information into an oscillating sinusoidal wave pulse, said oscillating sinusoidal wave pulse having a time duration corresponding to the value of said voltage.

4. The apparatus as claimed in claim 3 wherein said means for converting said voltage into an oscillating sinusoidal wave pulse comprises
    means for producing a ramp voltage increasing in value with time,
    means for producing an oscillating sinusoidal wave,
    means for turning said oscillating sinusoidal wave on at the beginning of said ramp voltage, and
    means for turning said oscillating sinusoidal wave off when said ramp voltage is equal to said analog voltage.

5. The apparatus as claimed in claim 4 wherein said means for turning said oscillating wave on at the beginning of said ramp voltage comprises
    means for producing a timing signal, and
    means for turning said oscillating wave on and off having a first switch input side and a line input side, said first switch input side connected to said means for producing a timing signal and said line side connected to said means for producing an oscillating sinusoidal wave.

6. The apparatus as claimed in claim 4 wherein said means for producing a ramp voltage comprises means for generating a square wave pulse, and means for integrating said square wave pulse to produce a ramp voltage.

7. The apparatus as claimed in claim 4 wherein said means for turning said oscillator on comprises means for comparing said ramp voltage to said analog voltage and producing an output signal when said ramp voltage is equal to said analog voltage, and means for turning said oscillator on and off having a second switch input side and a line input side, said second switch input side connected to the output side of said means for comparing said ramp voltage to said analog voltage, and said line side connected to said means for producing an oscillating sinusoidal wave.

8. The apparatus as claimed in claim 1 wherein said means for converting said oscillating sinusoidal wave pulse back into a signal similar to said input information signal comprises means for converting said oscillating sinusoidal wave pulse into a voltage analogous to the length of said oscillating sinusoidal wave pulse, and means for converting said voltage analogous to the length of said oscillating sinusoidal wave pulse into a bundle of information identical to the corresponding bundle of information of said input information signal represented by said oscillating sinusoidal wave pulse.

9. The apparatus as claimed in claim 8 wherein said means for converting said oscillating sinusoidal wave pulse into a voltage to the length of said oscillating sinusoidal wave pulse comprises means for converting said oscillating sinusoidal wave pulse into a square wave pulse having a pulse length corresponding to the length of said oscillating sinusoidal wave pulse, and means for converting said square wave pulse into a voltage analogous to the length of said oscillating sinusoidal wave pulse.

10. The apparatus as claimed in claim 9 wherein said means for converting said oscillating sinusoidal wave pulse into a square wave comprises means for detecting and eliminating ring-down at the trailing end of said oscillating sinusoidal wave pulse, and means for amplifying, clipping, rectifying and converting said oscillating sinusoidal wave pulse into a square wave whose length corresponds to the length of said oscillating sinusoidal wave pulse produced by said means for converting an input information carrying signal into an oscillating sinusoidal wave pulse.

11. The apparatus as claimed in claim 8 wherein said means for converting said voltage analogous to the length of said oscillating sinusoidal wave pulse into a bundle of information comprises means for producing switching voltages on a plurality of first lines in various permutations and combinations, means for producing a plurality of summing voltages having values in geometric progression, each on an individual second line, means for switching said summing voltages on and off in various permutations and combinations using said switching voltages, means for producing pseudoanalogous voltages by adding said various permutations and combinations of summing voltages so switched by said means for switching, means for comparing said pseudoanalogous voltages with said voltages analogous to the length of said oscillating sinusoidal wave pulses and stopping said means for producing switching voltages when a voltage analogous to the length of said oscillating sinusoidal wave pulse is approximately equal to a pseudoanalogous voltage, means for scanning said first lines having switching voltages thereon and detecting said switching voltages, and means for generating an output signal characteristic of the combination of said lines having switching voltages thereon.

12. The apparatus as claimed in claim 11 wherein said means for producing switching voltages on a plurality of first lines comprises means for generating a plurality of pulses serially in time, and means for adding said serially generated pulses in binary sum and displaying said sum as a voltage on a plurality of lines in various permutations and combinations.

13. The apparatus as claimed in claim 12 wherein said means for producing switching voltages further comprises means for stopping said pulse generator upon completion of each cycle of permutations and combinations of voltages, means for resetting said binary adder means to zero prior to starting said pulse generator, and means for starting said pulse generator after said scanning means completes its scan of said lines.

14. The apparatus as claimed in claim 1 further comprising means for producing said oscillating sinusoidal wave pulse in a particular time zone within said second time period beginning after said first predetermined time period.

15. The apparatus as claimed in claim 14 wherein said means for producing said oscillating sinusoidal wave pulse in a particular time zone comprises means for converting an input information carrying signal into distinguishable bundles of information occurring during a first time period, means for converting each of said bundles of information into an analogous voltage, the value of which is analogous to the information represented by said bundle, means for sampling and holding each of said analog voltages, means for converting an analog voltage into an oscillating sinusoidal wave pulse during a second time period after the end of said first time period, said time duration corresponding to the value of said analog voltage, and means for switching said sample and hold means during a particular time zone period.

16. The apparatus as claimed in claim 1 further comprising means for multiplexing a plurality of said oscillating sinusoidal wave pulses in time zones within said second time period.

17. The apparatus as claimed in claim 16 wherein said means for multiplexing a plurality of said oscillating sinusoidal wave pulses comprises means for converting at least two parallel input information carrying signals on at least two channels into a bundle of information, means for converting each of said bundles of information into an analog voltage, the value of which is analogous to the information represented by said bundle of information, means for sampling and holding said analog voltage on each channel, means for converting an analog voltage into an oscillating sinusoidal wave pulse, said oscillating sinusoidal wave pulse having a time duration corresponding to the value of said analog voltage, and means for switching said sample and hold means for each channel alternately connecting them to said analog voltage converter means.

18. The apparatus as claimed in claim 1 wherein said means for converting said oscillating sinusoidal wave pulse back into a signal similar to said input information carrying signal comprises means for converting said oscillating sinusoidal wave pulses into serially produced voltages analogous to the length of said oscillating sinusoidal wave pulses, means for converting said serially produced voltages analogous to the length of said oscillating sinusoidal wave pulses into parallel stored analog voltages on at least two channels, and means for converting said parallel stored analog voltages into an information signal corresponding to said input information carrying signal.

19. The apparatus as claimed in claim 18 further comprising means for timing the conversion of said serially produced analog voltages into parallel stored analog voltages and for converting said parallel stored analog voltages into an information carrying signal.

20. The apparatus as claimed in claim 1 wherein said second predetermined time period is of a time duration not more than one-half the time duration of said first predetermined time period.

* * * * *